United States Patent
Shinohara et al.

(10) Patent No.: US 9,118,894 B2
(45) Date of Patent: Aug. 25, 2015

(54) IMAGE PROCESSING APPARATUS AND IMAGE PROCESSING METHOD FOR SHIFTING PARALLAX IMAGES

(75) Inventors: Takayuki Shinohara, Tokyo (JP); Hidehiko Morisada, Tokyo (JP); Aritoki Kawai, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 405 days.

(21) Appl. No.: 13/569,235

(22) Filed: Aug. 8, 2012

(65) Prior Publication Data

US 2013/0050412 A1 Feb. 28, 2013

(30) Foreign Application Priority Data

Aug. 24, 2011 (JP) ................... 2011-183159

(51) Int. Cl.
*H04N 13/00* (2006.01)
*H04N 13/02* (2006.01)

(52) U.S. Cl.
CPC ....... *H04N 13/0022* (2013.01); *H04N 13/0011* (2013.01); *H04N 13/0278* (2013.01); *H04N 2013/0081* (2013.01)

(58) Field of Classification Search
CPC .......... H04N 13/0011; H04N 13/0014; H04N 13/0022; H04N 13/0029; H04N 13/0055; H04N 13/0278; H04N 5/23296; H04N 2013/0081; G06F 2203/04806; G06F 15/00; G06F 17/00; G06F 7/0075
USPC ............... 348/39, 42, 43, 46–47, 51; 345/419
See application file for complete search history.

(56) References Cited

U.S. PATENT DOCUMENTS

| | | | |
|---|---|---|---|
| 7,277,121 B2* | 10/2007 | Mashitani et al. | 348/51 |
| 7,576,742 B2* | 8/2009 | Kanematsu et al. | 345/427 |
| 7,652,665 B2* | 1/2010 | Fukushima et al. | 345/419 |
| 8,120,606 B2* | 2/2012 | Nakamura et al. | 345/419 |
| 8,610,774 B2* | 12/2013 | Onozawa | 348/143 |

(Continued)

FOREIGN PATENT DOCUMENTS

| JP | 2004-48725 | 2/2004 |
|---|---|---|
| JP | 2004-349731 | 12/2004 |

OTHER PUBLICATIONS

Notification of Reason(s) for Refusal dated Jun. 11, 2013, from corresponding Japanese Application No. 2011-183159.

*Primary Examiner* — Brian Yenke
(74) *Attorney, Agent, or Firm* — Katten Muchin Rosenman LLP

(57) ABSTRACT

A viewpoint position sets, when a stereoscopic video image is provided that includes a left-eye parallax image and a right-eye parallax image having a predetermined parallax distribution and that is observed from a given viewpoint, a virtual viewpoint for observing a subject from another viewpoint. A parallax image generation unit generates a left-eye and a right-eye parallax image for providing a desired parallax distribution that are obtained when an observation is made from the virtual viewpoint, by shifting the image cut-out position of at least one of the left-eye or the right-eye parallax image. When the shift amount at the image cut-out position changes due to a position change of the virtual viewpoint, the parallax image generation unit generates a parallax image while changing the shift amount in stages from a shift amount obtained before the change to a shift amount obtained after the change.

7 Claims, 17 Drawing Sheets

(56) References Cited

U.S. PATENT DOCUMENTS

| | | | |
|---|---|---|---|
| 8,717,353 B2* | 5/2014 | Sato | 345/419 |
| 2002/0030675 A1* | 3/2002 | Kawai | 345/204 |
| 2002/0141635 A1* | 10/2002 | Swift et al. | 382/154 |
| 2004/0125044 A1* | 7/2004 | Suzuki | 345/1.1 |
| 2005/0190989 A1* | 9/2005 | Kondo et al. | 382/293 |
| 2006/0192776 A1* | 8/2006 | Nomura et al. | 345/419 |
| 2006/0209183 A1* | 9/2006 | Mashitani et al. | 348/51 |
| 2007/0121182 A1* | 5/2007 | Fukushima et al. | 359/9 |
| 2010/0039499 A1* | 2/2010 | Nomura et al. | 348/43 |
| 2010/0086222 A1* | 4/2010 | Shimizu et al. | 382/232 |
| 2010/0201789 A1* | 8/2010 | Yahagi | 348/51 |
| 2011/0018969 A1* | 1/2011 | Tanaka | 348/47 |
| 2011/0221866 A1* | 9/2011 | Ohta | 348/46 |
| 2011/0228057 A1* | 9/2011 | Kobayashi | 348/51 |
| 2012/0108328 A1* | 5/2012 | Konno et al. | 463/31 |
| 2013/0076856 A1* | 3/2013 | Wakabayashi | 348/36 |
| 2013/0113793 A1* | 5/2013 | Uchida | 345/419 |
| 2013/0225289 A1* | 8/2013 | Yoshimitsu | 463/31 |
| 2013/0314402 A1* | 11/2013 | Furumura et al. | 345/419 |
| 2014/0104684 A1* | 4/2014 | Ohta | 359/467 |
| 2014/0168381 A1* | 6/2014 | Wada | 348/47 |

* cited by examiner

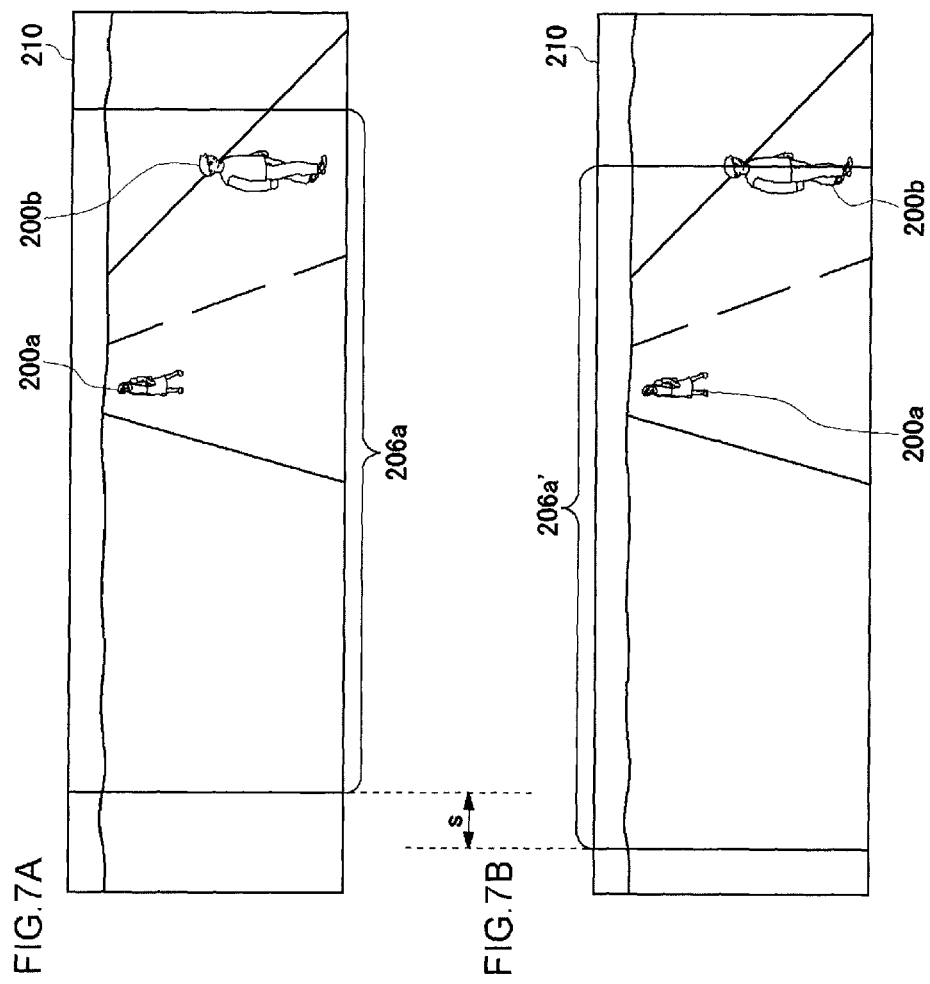

IMAGE PROCESSING APPARATUS AND IMAGE PROCESSING METHOD FOR SHIFTING PARALLAX IMAGES

BACKGROUND OF THE INVENTION

1. Field of the Invention

The present inventions relates to an image processing apparatus and an image processing method.

2. Description of the Related Art

Recently, an imaging device has become widely used that is capable of generating a stereoscopic image including a left-eye parallax image and a right-eye parallax image of a subject. Such an imaging device can be, e.g., a multiview camera having two or more optical systems for imaging or can generate parallax images by image processing of images captured from multiple different viewpoints using a single-lens camera.

On the other hand, a display device has also become widely used that is for presenting a video image with a depth to a viewer by presenting a left-eye image and a right-eye image included in a stereoscopic image to a left eye and a right eye of the viewer, respectively. In particular, three-dimensional televisions for consumer use that use shutter glasses are spreading rapidly, and there are more opportunities to view stereoscopic images freely in a living room that are captured by a general audience.

When viewing a stereoscopic image including a left-eye parallax image and a right-eye parallax image on a display device, the viewer tries to localize the stereoscopic image in the brain by mainly using binocular parallax as a cue. If an image displayed on the display device is not appropriate as a stereoscopic image, a burden associated with stereoscopic viewing while adjusting the convergence angle of both eyes, etc., can be imposed on the viewer. Even in the case of content provided by a provider of a stereoscopic image after performing proper parallax adjustment for realizing a stereoscopic video image, a case might occur where a video image that is not appropriate as a stereoscopic image is generated as a result of a viewer reducing or enlarging the stereoscopic video image for display or the viewer cutting out a part of the stereoscopic video image for display.

SUMMARY OF THE INVENTION

In this background, a purpose of the present invention is to provide a technology for reducing a burden on a viewer that is associated with stereoscopic image viewing.

One embodiment of the present invention relates to an image processing apparatus. The apparatus comprises: a viewpoint setting unit configured to set, when a stereoscopic video image is provided that includes a left-eye parallax image and a right-eye parallax image having a predetermined parallax distribution and that is observed from a given viewpoint, a virtual viewpoint for observing a subject in the stereoscopic video image from another viewpoint; and a parallax image generation unit configured to generate a left-eye parallax image and a right-eye parallax image for providing a desired parallax distribution obtained when an observation is made from the viewpoint set by the viewpoint setting unit, by shifting an image cut-out position of one of the left-eye parallax image or the right-eye parallax image. When a shift amount at the image cut-out position changes due to a change made in the position of the virtual viewpoint, the parallax image generation unit generates a parallax image while changing the shift amount in stages, from a shift amount obtained before the change to a shift amount obtained after the change.

Another embodiment of the present invention relates to an image processing method. This method allows a processor to: set, when a stereoscopic video image is provided that includes a left-eye parallax image and a right-eye parallax image having a predetermined parallax distribution and that is observed from a given viewpoint, a virtual viewpoint for observing a subject in the stereoscopic video image from another viewpoint; generate a left-eye parallax image and a right-eye parallax image for providing a desired parallax distribution when an observation is made from the viewpoint, by shifting an image cut-out position of one of the left-eye parallax image or the right-eye parallax image; and generate, when a shift amount at the cut-out position changes due to a change made in the position of the virtual viewpoint, a parallax image while changing the shift amount in stages, from a shift amount obtained before the change to a shift amount obtained after the change.

Optional combinations of the aforementioned constituting elements, and implementations of the invention in the form of methods, apparatuses, systems, computer programs, data structures, and recording media may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 7A and 7B are diagrams for explaining a relationship between a parallax adjustment and an image cut-out position;

DETAILED DESCRIPTION OF THE INVENTION

The invention will now be described by reference to the preferred embodiments. This does not intend to limit the scope of the present invention, but to exemplify the invention.

[Stereoscopic Video Images Utilizing Parallax Images]

Figure 1:
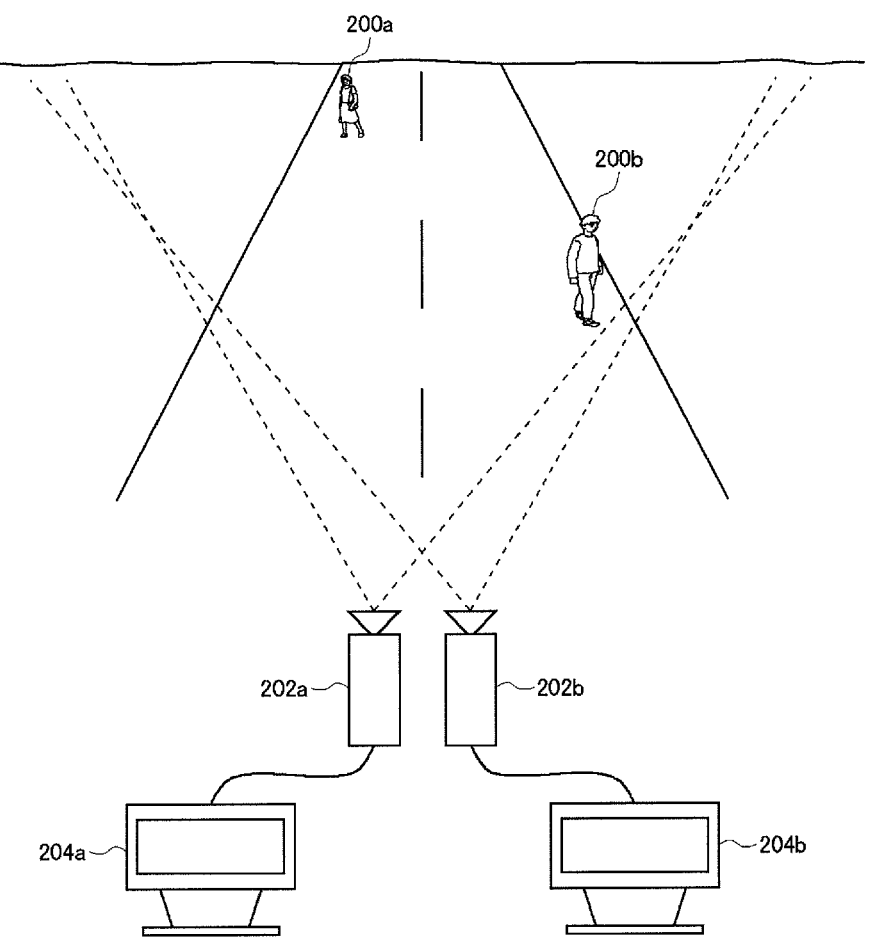
FIG. 1 is a diagram illustrating a relationship between a subject and parallax images thereof in a three-dimension space.

FIG. 1 is a diagram illustrating a relationship between a subject and parallax images thereof in a three-dimension space. In a three-dimensional space, two subjects, a subject 200a and a subject 200b, (hereinafter, generically referred to as "subjects 200") are imaged by two cameras, a left-eye camera 202a adapted to image the subjects 200 from left and a right-eye camera 202b adapted to image the subjects 200 from right, (hereinafter, generically referred to as "cameras 202"). Referring to FIG. 1, a video image of the subjects 200 imaged by the left-eye camera 202a and a video image of the subjects 200 imaged by the right-eye camera 202b are displayed on a monitor 204a and a monitor 204b, respectively, which will be generically referred to as monitors 204.

The left-eye camera 202a and the right-eye camera 202b image the subjects 200 from different positions. Therefore, the video image displayed on the monitor 204a and the video image displayed on the monitor 204b show the subjects 200 oriented in different directions. As described, images of the subjects 200 in a three-dimensional space as viewed from different viewpoints are referred to as "parallax images."

Since human eyes are spaced apart by about 6 cm, parallax is produced between an image viewed by the left eye and an image viewed by the right eye. Human brain is said to use parallax images perceived by the left and right eyes as one of information sets for recognizing the depth of an object. For this reason, by projecting a parallax image perceived by the left eye and a parallax image perceived by the right eye to the respective eyes, a video image having a depth is perceived by a person.

Figure 2:
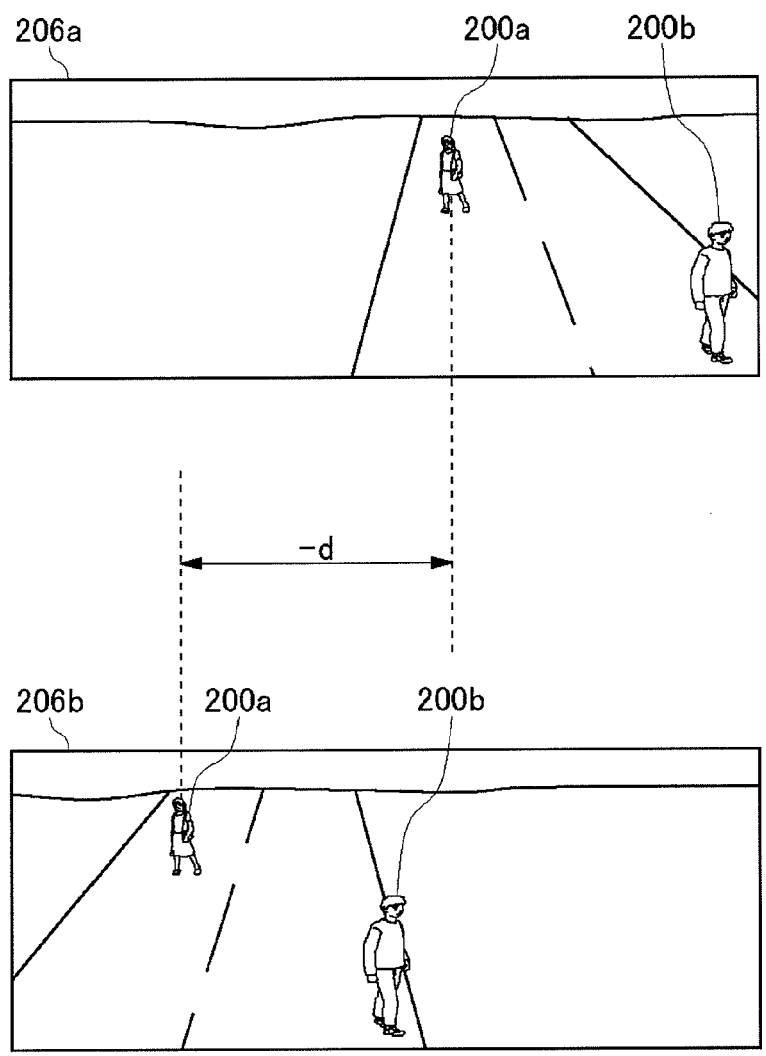
FIG. 2 is a diagram illustrating an example of a left-eye parallax image and a right-eye parallax image.

FIG. 2 is a diagram illustrating an example of a left-eye parallax image and a right-eye parallax image and also illustrates an example of video images captured by the cameras 202 shown in FIG. 1. FIG. 2 illustrates a left-eye parallax image 206a and a right-eye parallax image 206b, which are generically referred to as parallax images 206. In FIG. 1, the left-eye camera 202a is located to the left of the right-eye camera 202b facing the two subjects 200 and captures an image such that the video image of the subject 200a is almost at the center. On the other hand, the right-eye camera 202b is located to the right of the left-eye camera 202a facing the two subjects 200 and captures an image such that the video image of the subject 200b is almost at the center.

As a result, when focusing on, for example, the subject 200a, the subject 200a is located almost at the center of the left-eye parallax image 206a while the subject 200a is located to the left of the center of the right-eye parallax image 206b. Parallax is a displacement in an image-capturing position of the same subject 200 between the left and right parallax images 206 to be paired up. For example, the parallax of the subject 200a is shown using "-d" in FIG. 2. Reasons for why the value of the parallax is a negative value in the example shown in FIG. 2 will be described later.

In general, parallax is defined in units of pixels. In a parallax image 206, there are normally a plurality of pixels that constitute a subject 200. Thus, strictly speaking, an expression stating "parallax d of the subject 200a" is not a correct expression. A parallax is calculated by, for example, performing DP matching (Dynamic Programming matching) or the like between the left-eye parallax image 206a and the right-eye parallax image 206b so as to obtain corresponding points between respective pixels and then calculating a distance between the corresponding points. Hereinafter, the parallax of pixels that constitute a subject 200 in a parallax image 206 is sometimes shortened and expressed merely as the "parallax of the subject 200" in the specification. Information showing, in an image format, a parallax at each pixel of the left-eye parallax image 206a or the right-eye parallax image 206b in association with the pixel is called a "parallax map."

The size of the parallax d defined above varies depending on the size of a display device that displays a parallax image 206. For example, it is assumed that the parallax of the subject 200 is 2 cm on the display device when the parallax image 206 is displayed on the display device. In this case, if the same parallax image 206 is displayed on another display device whose pixel pitch is twice the size in the horizontal direction, the parallax of the subject 200 becomes 4 cm, which is twice the size, on the device. In the specification, the "parallax of the subject 200" means parallax obtained when the parallax image 206 is actually displayed on a display device, and the unit thereof is cm in the following.

A viewer perceives a stereoscopic video image as a video image having a depth by a viewer. However, the user perceives a subject with zero parallax as being localized on a display device. When the image-capturing position of the subject 200 in the right-eye parallax image 206b is off to the left side in the image compared to that of the subject 200 in the left-eye parallax image 206a, the viewer perceives the subject 200 as being localized on a viewpoint side with respect to the display device. On the other hand, when the image-capturing position of the subject 200 in the right-eye parallax image 206b is off to the right side in the image compared to that of the subject 200 in the left-eye parallax image 206a, the viewer perceives the subject 200 as being localized at the back in the line of sight with respect to the display device. As the absolute value of the parallax d increases, the subject 200 is perceived as being localized further away from the display device.

In the specification, the parallax of the subject 200 when the subject 200 is localized at the back in the line of sight with respect to the display device for the viewer is referred to as "positive parallax," and the parallax of the subject 200 when the subject 200 is localized on the viewer's side with respect to the display device is referred to as "negative parallax" in the following. For example, if the parallax of the subject 200 is −2 cm, the subject 200 is perceived as being localized on the viewer's side with respect to the display device. In the example shown in FIG. 2, the image-capturing position of the subject 200a in the right-eye parallax image 206b is off to the left side in the image compared to that of the subject 200a in the left-eye parallax image 206a, and the parallax thus becomes negative.

[Parallax Distribution]

An explanation is given of a "parallax distribution" in the following in reference to FIGS. 3, 4, 5, and 6. In the specification, the "parallax distribution" is, e.g., a counting in degrees of respective parallaxes of pixels constituting the parallax image 206. In other words, this corresponds to a counting of components of the parallax map in degrees. A histogram of parallax distribution showing the size of parallax in the horizontal axis and the degree of parallax in the vertical direction is simply referred to as a parallax distribution. The parallax image 206 is originally shown by a pair of the left-eye parallax image 206a and the right-eye parallax image 206b. However, an explanation thereof is hereinafter given simply stating a parallax image as a parallax image 206 as long as it is not necessary to particularly distinguish the two.

Figure 3:
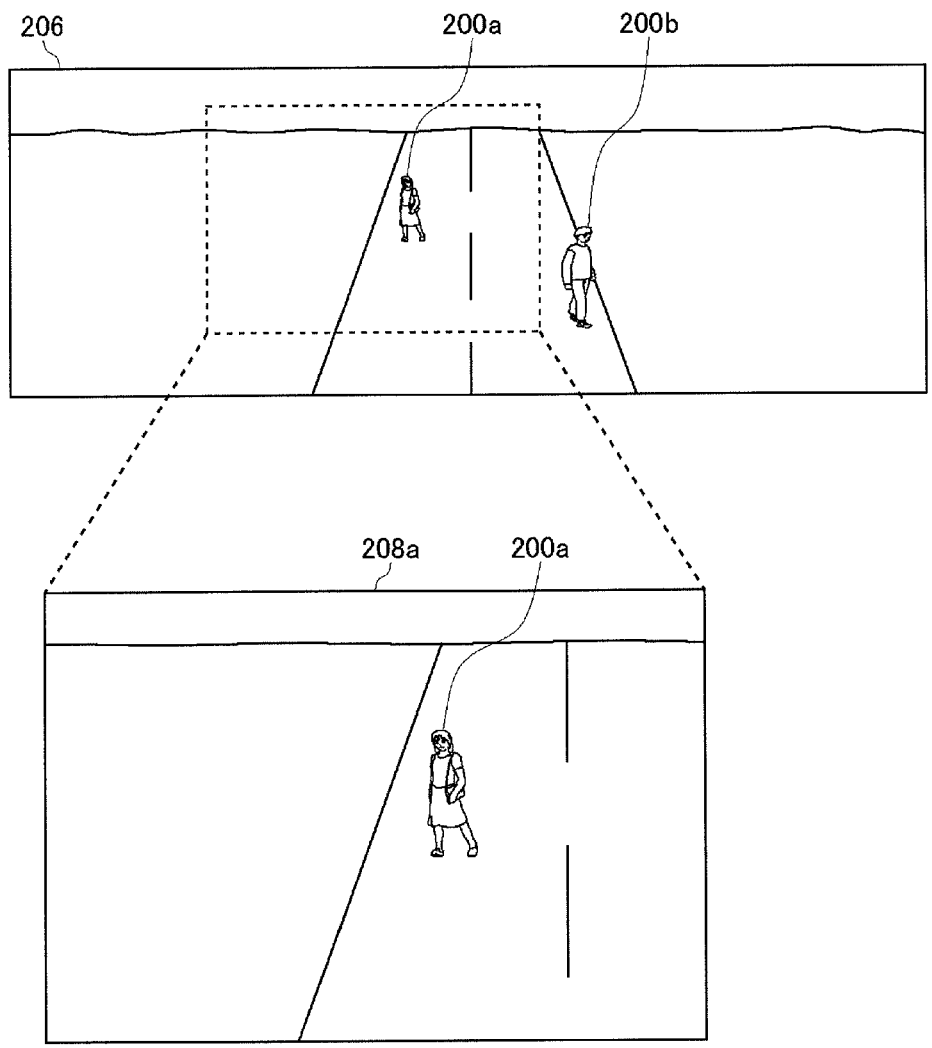
FIG. 3 is a diagram illustrating an example of a partial image that shows a part of a parallax image.

FIG. 3 is a diagram illustrating an example of a partial image that shows a part of the parallax image 206. Only the subject 200a of two subjects 200 exists in a partial image 208a shown in FIG. 3. For example, if the number of pixels of the parallax image 206 is larger than the number of pixels of the display device, the partial image 208a is generated, for example, when displaying the parallax image 206 at the same magnification.

Figure 4:
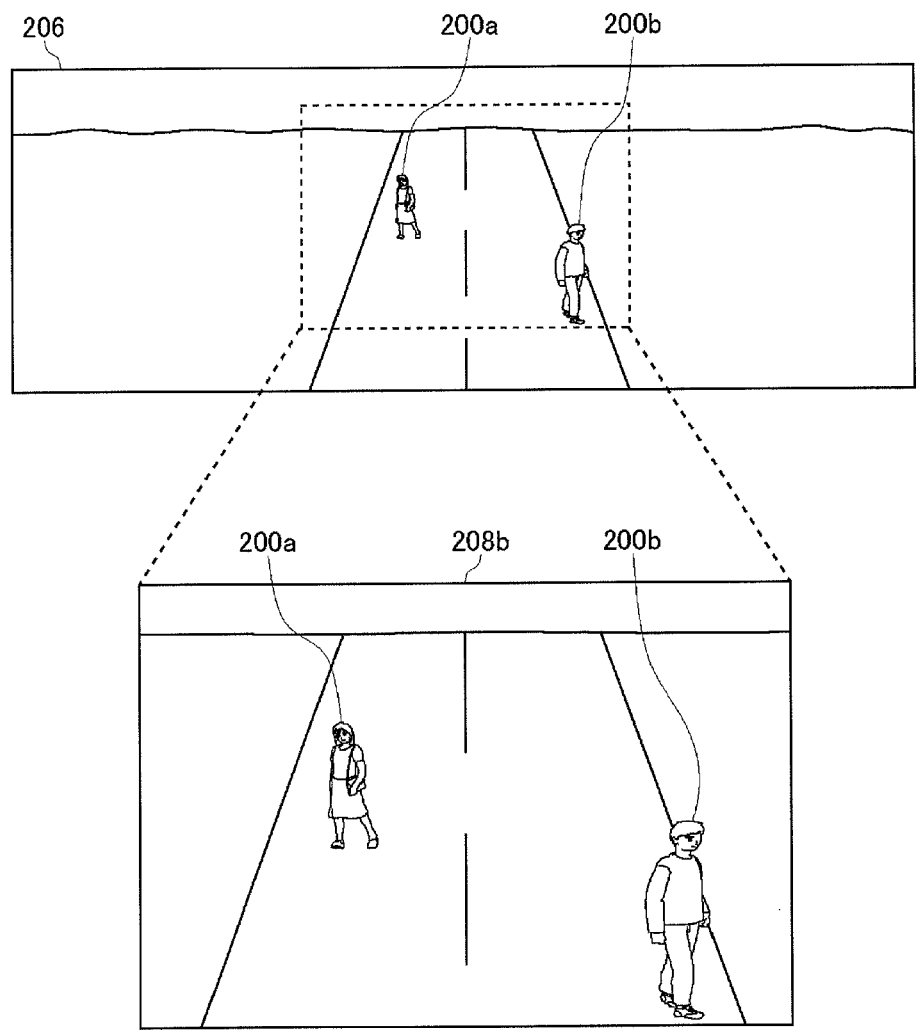
FIG. 4 is a diagram illustrating another example of a partial image that shows a part of the parallax image.

FIG. 4 is a diagram illustrating another example of a partial image that shows a part of the parallax image 206. There are occasions when the viewer views the image while panning the image if the parallax image 206 is a panoramic image. The example shown in FIG. 4 shows that a display area displayed on the display device has been moved from the area of the partial image 208a shown in FIG. 3 to the area of a partial image 208b shown in FIG. 4 by panning the image. The subject 200b as well as the subject 200a exist in the partial image 208b shown in FIG. 4.

As described, for example, when displaying the parallax image 206 while panning the parallax image 206, a subject that exists in a partial image 208 serving as the display area changes. When the subject that exists in the partial image 208 serving as the display area changes, a parallax distribution in the partial image 208 also changes.

Figure 5:
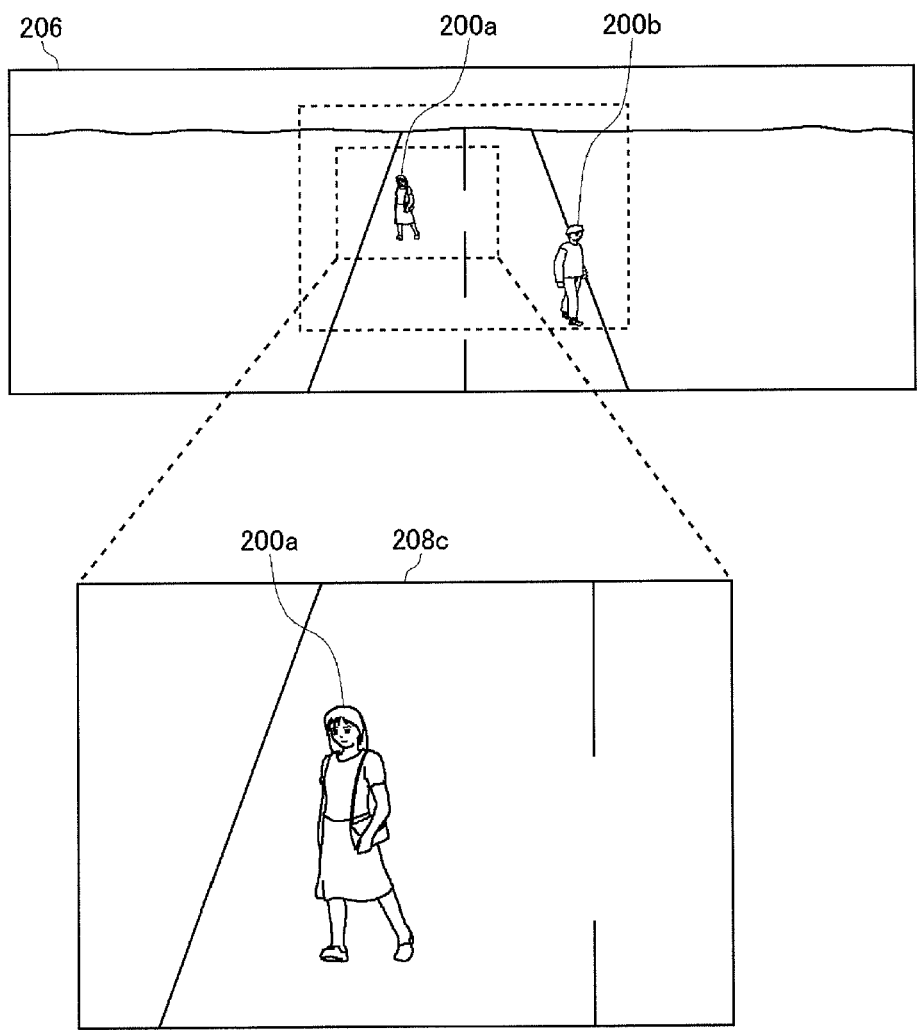
FIG. 5 is a diagram illustrating yet another example of a partial image that shows a part of the parallax image.

FIG. 5 is a diagram illustrating yet another example of a partial image that shows a part of the parallax image 206. A partial image 208c shown in FIG. 5 is generated, for example, when a part of the partial image 208b shown in FIG. 4 is enlarged for display. The field of view becomes decreased as a part of the partial image 208b is enlarged, and the subject 200b goes out of the display area. As a result, only the subject 200a results in existing in the partial image 208c shown in FIG. 5.

As described, in addition to the case of displaying the parallax image 206 while panning the parallax image 206, a subject that exists in the partial image 208 serving as a display area changes when enlarging or reducing the parallax image 206 for display. The parallax distribution in the partial image 208 also changes.

Figure 6A:
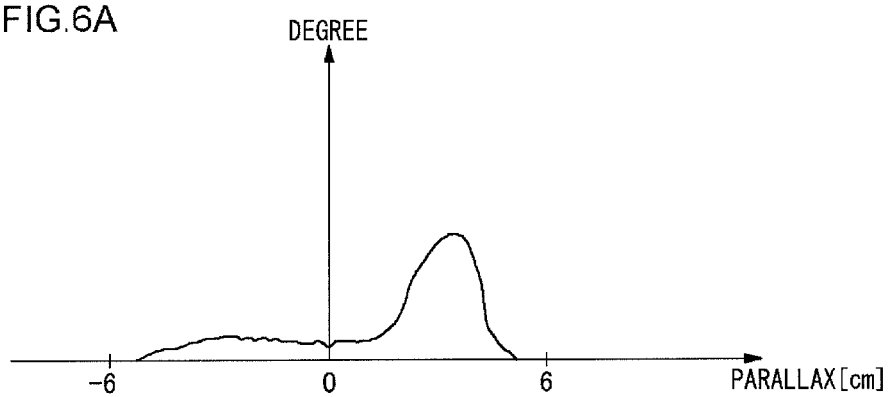
FIG. 6A is a diagram illustrating a histogram of a parallax distribution of the partial image shown in FIG. 3.
Figure 6B:
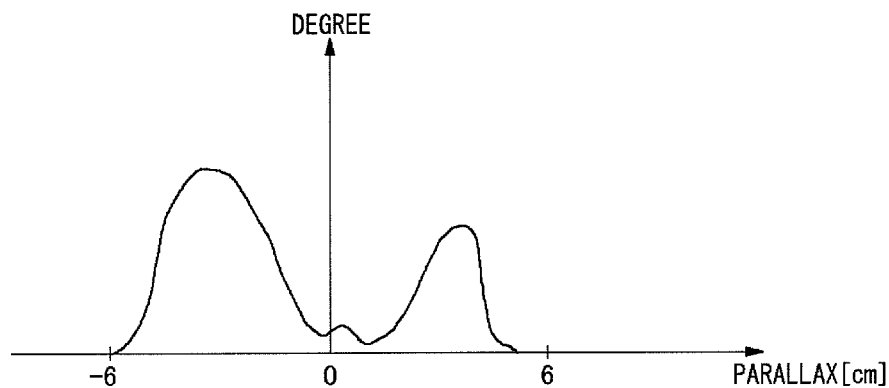
FIG. 6B is a diagram illustrating a histogram of a parallax distribution of the partial image shown in FIG. 4.
Figure 6C:
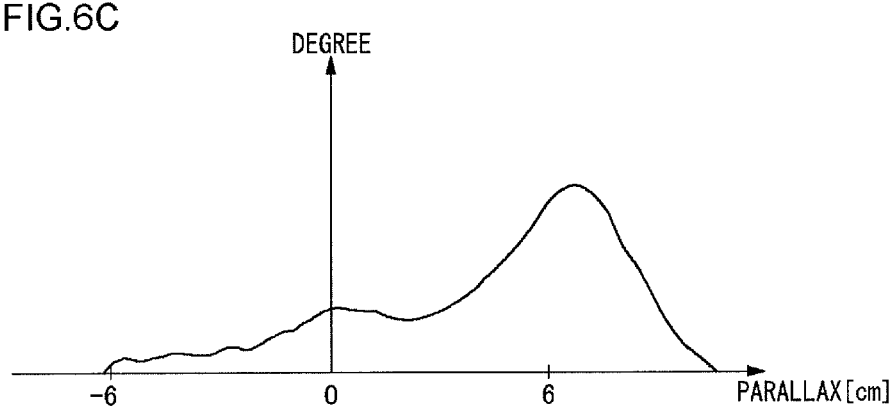
FIG. 6C is a diagram illustrating a histogram of a parallax distribution of the partial image shown in FIG. 5.

FIGS. 6A-6C are diagrams each illustrating, in a histogram format, the parallax distribution of a partial image showing a part of the parallax image 206. FIG. 6A illustrates a histogram of the parallax distribution of the partial image 208a shown in FIG. 3. FIG. 6B illustrates a histogram of the parallax distribution of the partial image 208b shown in FIG. 4. FIG. 6C illustrates a histogram of the parallax distribution of the partial image 208c shown in FIG. 5.

As shown in FIG. 3, the subject 200a exists in the partial image 208a. Compared to the subject 200b, the subject 200a exists at the back in the line of sight. In FIG. 6A, parallaxes concentrate around +3 cm, and it is shown that the subject 200a is localized behind the display device.

When the viewer pans the parallax image 206 such that the display area shows the partial image 208b shown in FIG. 4, the subject 200a and the subject 200b will concurrently exist in the partial image 208b. In FIG. 6B, parallaxes concentrate around −3 cm and around +3 cm, and it is shown that the subject 200a is localized behind the display device and that the subject 200b is localized on the viewer's side with respect to the display device. If the real size of the subject 200a and the real size of the subject 200b are almost the same, the subject that is closer to the cameras 202 is captured in a larger size in the parallax image 206. In FIG. 6B, it means that the subject 200b localized around −3 cm covers a larger area compared to the subject 200a localized around +3 cm in the partial image 208.

When the viewer enlarges a part of the partial image 208b shown in FIG. 4 such that the display area shows the partial image 208c shown in FIG. 5, only the subject 200a will exist in the partial image 208c. The partial image 208a and the partial image 208c share similarity in that only the subject 200a exists therein and are different in the enlargement/reduction ratio of an image. More specifically, the partial image 208c displays an image that is enlarged compared to that of the partial image 208a.

FIG. 6C shows that parallaxes concentrate around +4 cm. In comparison to the distribution shown in FIG. 6A, a curve indicating distribution has a higher peak, and the size of parallax that indicates the peak of the distribution is larger than around 3 cm. As described, a part of the parallax distribution becomes missing due to a reduction of the display area when the parallax image is enlarged, and the remaining parallax distribution is enlarged. In contrast, the display area becomes larger as the parallax image is reduced, and a parallax distribution of the subject that thus emerges will be added to the existing parallax distribution.

[Adjustment of Parallax]

As described in reference to FIG. 2, parallax is the amount of a displacement in an image-capturing position of the same subject 200 between the left and right parallax images 206 to be paired up. Therefore, when focusing on a given subject 200, the position in the depth direction at which the subject is localized can be adjusted by adjusting a displacement in an image-capturing position between left and right parallax images 206. This can be achieved by preparing in advance an original image for parallax adjustment that has a larger area than a display area and then by shifting a position at which the original image for parallax adjustment is cut out as the display area. Obviously, a pair of a left-eye original image for parallax adjustment and a right-eye original image for parallax adjustment also constitutes a stereoscopic video image. An original image for parallax adjustment can be also said to be a parallax image.

FIGS. 7A and 7B are diagrams for explaining a relationship between parallax adjustment and an image cut-out position. FIGS. 7A and 7B illustrate an example of the position of an original image 210 for parallax adjustment of the left-eye parallax image 206a. As shown in FIG. 7A, the left-eye parallax image 206a is a partial image of the original image 210 for parallax adjustment. The subject 200a exists almost at the center of the left-eye parallax image 206a. When a position in the original image 210 for parallax adjustment at which a left-eye parallax image is cut out is shifted to the left so as to create a new left-eye parallax image 206a', the position of the subject 200a in the left-eye parallax image 206a' will be relatively shifted to the right. This allows the parallax of the subject 200a to be changed that is between the left-eye parallax image and the right-eye parallax image 206b to be paired up.

When the image cut-out position is changed, the parallax of the entire image as well as the parallax of the subject 200a changes. Changing the image cut-out position changes the shape of a histogram of a parallax distribution. However, if a change in the image cut-out position is small, a change in the shape of the histogram is also small. Therefore, changing the image cut-out position is almost the same as changing the origin of the histogram of the parallax distribution. In the subject application, a shift of the cut-out position of at least one of the left-eye parallax image 206a or the right-eye parallax image 206b is sometimes simply referred to as "adjustment of parallax," hereinafter. The amount of a shift of the cut-out position is sometimes simply referred to as a "shift amount." In FIG. 7, a length shown by "s" is a shift amount.

For example, in order to localize the subject 200a near the display device in the example shown in FIG. 2, the cut-out position needs to be shifted such that the parallax of the subject 200a in the parallax image 206 becomes zero. There are normally a plurality of pixels that constitute the subject 200a. Thus, in reality, the cut-out position is shifted such that the parallax distribution of the subject 200a has a peak near the origin.

[Proper Parallax Distribution]

As previously described, the spacing between the eyes of people is approximately 6 cm. Therefore, for the viewer observing a subject having a parallax of +6 cm on a display device, the subject is perceived as being localized at infinity. If there is a subject having a parallax of +6 cm or more on the display device, it is difficult for the viewer to adjust the convergence angle of both eyes, etc., possibly imposing a burden on the viewer. Therefore, a parallax image 206 with a parallax distribution of more than +6 cm can be said to be a parallax image that imposes a burden on the viewer that is associated with stereoscopic viewing while adjusting the convergence angle of both eyes, etc. If a subject is perceived to be localized on the viewer's side with respect to a display device, i.e., if a parallax distribution has a negative value, there is not a restriction such as the one described above, and a range that allows the viewer to comfortably have a stereoscopic view changes depending on the size of the display device. The range is also indicated by medical research, etc. Thus, in consideration of these described points, it is only necessary to determine through experiments the lower limit of the parallax distribution that allows the viewer to comfortably have a stereoscopic view. A distribution in a range in which a parallax is between the determined lower limit and +6 cm on the display device is referred to as a minimal parallax distribution to be satisfied as a stereoscopic video image.

Of parallax images having parallax distributions to be satisfied as stereoscopic video images, a parallax image having a distribution in which there are many subjects localized on the display device, i.e., a parallax image having a parallax distribution that has a peak near zero is known to be a stereoscopic video image that can be easily observed by the viewer. A parallax distribution in which the distribution of parallaxes concentrate near zero is referred to as a "proper parallax distribution."

[Algorithm for Parallax Adjustment]

In general, stereoscopic video images produced and provided by a professional creator of stereoscopic video images have often been adjusted to have a proper parallax distribution. There is also a case where a stereoscopic video image is adjusted by the creator from an artistic perspective, etc., such that the stereoscopic video image has a parallax distribution different from the above-stated proper parallax distribution. However, it is normal that the adjustment is made within the range of a minimal parallax distribution to be satisfied as a stereoscopic video image. Therefore, when the stereoscopic video image is obtained by, e.g., a means such as purchasing, the viewer can view the stereoscopic video image without any burden.

However, for example, when the viewer displays only a part of the stereoscopic video image by enlarging the stereoscopic video image for display, as described above, a parallax distribution in a display area becomes different from the parallax distribution of the original stereoscopic video image. In such a case, an automatic adjustment is sometimes made by a reproduction device such that the parallax distribution in the display area becomes a proper parallax distribution. In reference to FIGS. 8, 9, and 10, a detailed description will be made in the following regarding an example of an algorithm for adjusting a parallax distribution to be a proper parallax distribution.

Figure 8A:
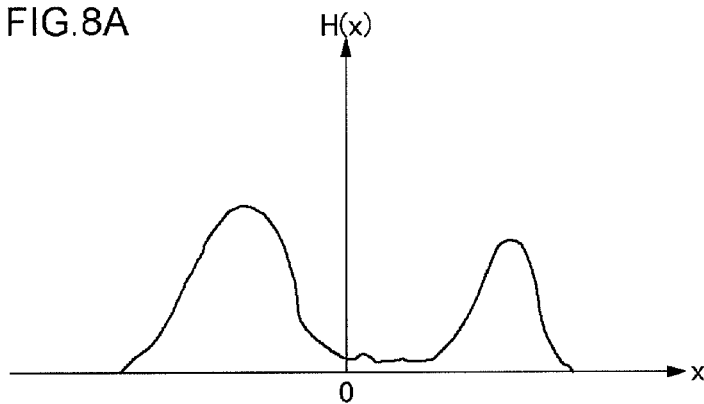
FIG. 8A is a diagram in which a parallax in a parallax image is represented by x and in which a histogram frequency is represented by histogram $H(x)$, which is a function of x.
Figure 8B:
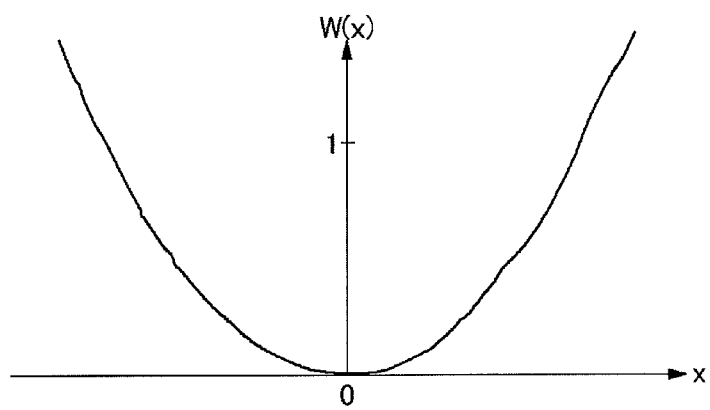
FIG. 8B is a diagram illustrating the approximate outline of a weighting function $W(x)$ used to obtain a proper parallax distribution.
Figure 8C:
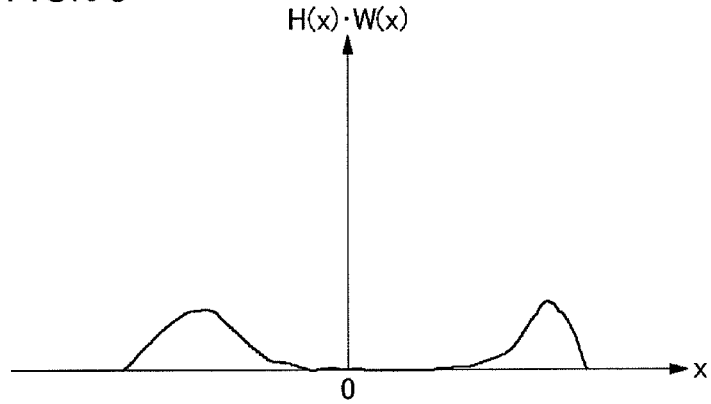
FIG. 8C is a diagram illustrating the approximate outline of a product $H(x)*W(x)$ of the histogram function $H(x)$ and the weighting function $W(x)$.

FIG. 8 is a diagram for explaining an algorithm for adjusting a parallax distribution. FIG. 8A is a diagram in which a parallax in a parallax image is represented by x and in which a histogram frequency is represented by histogram H(x), which is a function of x. FIG. 8B is a diagram illustrating the approximate outline of a weighting function W(x) used to obtain a proper parallax distribution. The details of the weighting function W(x) will be described later. FIG. 8C is a diagram illustrating the approximate outline of a product H(x)*W(x) of the histogram function H(x) and the weighting function W(x).

As shown in FIG. 8B, the weighting function W(x) is a convex function whose value becomes zero at the origin and becomes larger as being farther away from the origin. Therefore, as shown in FIG. 8C, a product of the histogram function H(x) and the weighting function W(x) is a function whose value becomes smaller near the origin and becomes relatively larger as being farther away from the origin.

Figure 9A:
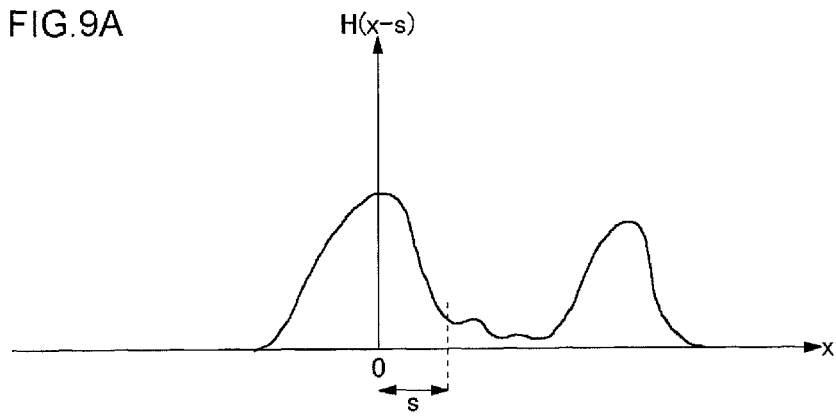
FIG. 9A is a diagram illustrating a function $H(x-s)$ obtained by shifting the histogram function $H(x)$ shown in FIG. 8A by an amount of s in an x-axis direction.
Figure 9B:
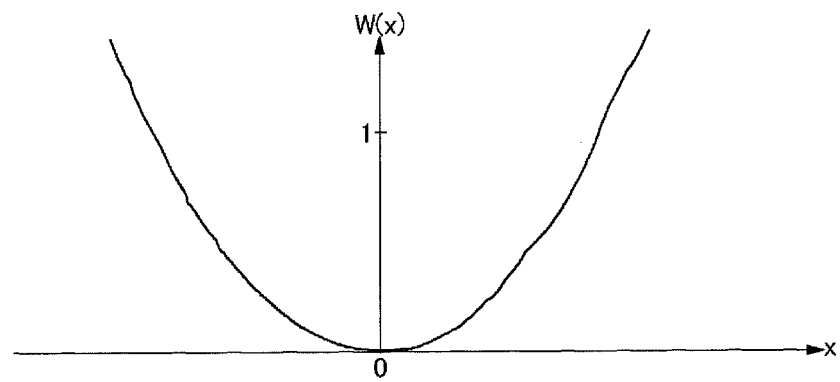
FIG. 9B is a diagram illustrating the approximate outline of the weighting function $W(x)$ and the diagram is the same as that shown in FIG. 8B.
Figure 9C:
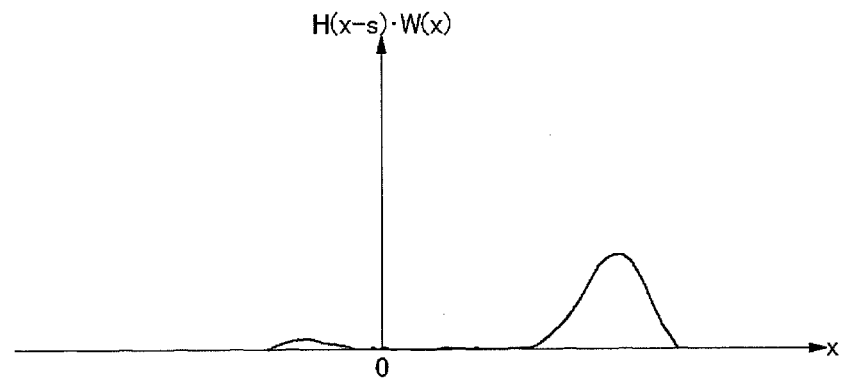
FIG. 9C is a diagram illustrating the approximate outline of a product H(x−s)*W(x) of the histogram function H(x−s) and W(x)

FIG. 9 is another diagram for explaining an algorithm for adjusting a parallax distribution. FIG. 9A is a diagram illustrating a function H(x−s) obtained by shifting the histogram function H(x) shown in FIG. 8A by an amount of in an x-axis direction. FIG. 9B is a diagram illustrating the approximate outline of the weighting function W(x) and the diagram is the same as that shown in FIG. 8B. FIG. 9C is a diagram illustrating the approximate outline of a product H(x−s)*W(x) of the histogram function H(x−s) and W(x).

In FIG. 9C, a product of the histogram function H(x−s) and the weighting function W(x) is a function whose value becomes smaller near the origin and becomes relatively larger as being farther away from the origin, as in FIG. 8C.

As is obvious from FIGS. 8C and 9C, when the value of the histogram function H(x−s) becomes larger near the origin and becomes smaller as being farther away from the origin where s is any real number, the area of a section bounded by a function H(x−s)*W(x) and an x-axis becomes smaller compared to the opposite case thereof. Therefore, the area of the section bounded by the function H(x−s)*W(x) and the x-axis represents a measure for indicating whether or not the shape of the histogram denoted by the function H(x−s) shows concentration near the origin. The following evaluation function E(s) is defined.

$$E(s)=\int W(x)*H(x-s)dx \quad (1)$$

For example, when s=0 in the above expression (1), the expression is shown as follows:

$$E(0)=\int W(x)*H(x)dx$$

This expression represents the area of a region bounded by the function W(x)*H(x) and the x-axis shown in FIG. 8C. As described, the evaluation function E(s) shown by the expression (1) is a measure that indicates an area of a section bounded by a product W(x)*H(x−s) of the function H(x−s), which is obtained by shifting the histogram function H(x) by an amount of s in the x-axis direction, and the weighting function W(x) and by the x-axis. In other words, this represents a measure for indicating whether or not the shape of the histogram denoted by the function H(x−s) shows concentration near the origin.

Therefore, it can be said from a perspective that evaluation is performed using the evaluation function E(s) that the function H(x−s) that can be obtained by shifting the histogram function H(x) by the amount of the value of s that allows the evaluation function E(s) to have the smallest value represents a histogram whose shape shows the highest distribution concentration near the origin. In other words, it can be said that the function H(x−s) represents a "proper parallax distribution." As described above, when a cut-out position of a parallax image is shifted by the amount of s, the origin of a parallax distribution obtained at that time is also shifted by the amount of s. Thus, the value of s that allows the evaluation function E(s) to have the smallest value represents a shift amount by which shifting is to be carried out when cutting out a parallax image 206 from the original image 210 for parallax adjustment such that the parallax image 206 has a proper parallax distribution. Obviously, the shape of the weighting function W(x) is not limited to the shape shown in FIG. 8B. It is only necessary to set a desired parallax distribution as a "proper parallax distribution" and then determine through experiments a weighting function that allows such a parallax distribution to be obtained.

Therefore, when a parallax image 206 having a predetermined parallax distribution is provided, it is only necessary, in order to make an adjustment such that the parallax image 206 has a desired proper parallax distribution, to carry out shifting by the amount of s that allows the evaluation function E(s) to have the smallest value for cutting out. When the shift amount obtained at this time is denoted as $s_{opt}$, $s_{opt}$ is shown in the following expression.

$$s_{opt} = \arg\min E(s) \quad (2)$$

In the expression, argminE(s) means the value of s when the function E(s) has the smallest value.

[Rapid Change in Shift Amount]

The above-described algorithm is used to obtain a shift amount for making an adjustment, when a given parallax image 206 is provided, such that the parallax image 206 has a proper parallax distribution. For example, when a viewer displays a given parallax image 206 while panning the parallax image 206, a parallax image that is currently being displayed on a display device can be adjusted such that the parallax image has a proper parallax distribution by using this algorithm. However, the above-described algorithm is used to obtain a proper shift amount for a parallax image that is currently being displayed and is irrespective of a shift amount of a parallax image to be displayed at a subsequent moment and a shift amount in the past. Therefore, even when a parallax image 206 is displayed while a display area is being continuously changed, a change in a shift amount can become large enough to provide a sense of incongruity to a viewer depending on a condition.

Figure 10A:
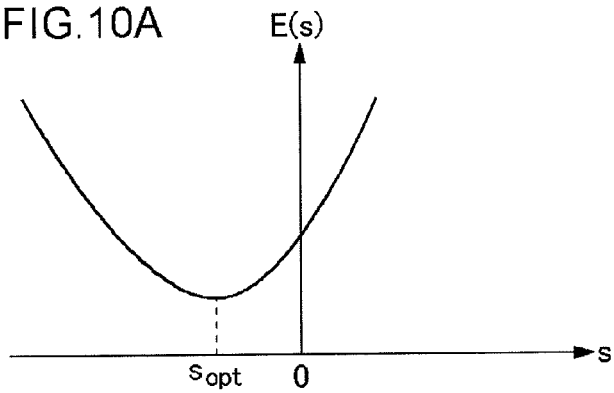
FIG. 10A is a diagram illustrating the approximate outline of an evaluation function E(s) when the histogram shown in FIG. 6A is used.
Figure 10B:
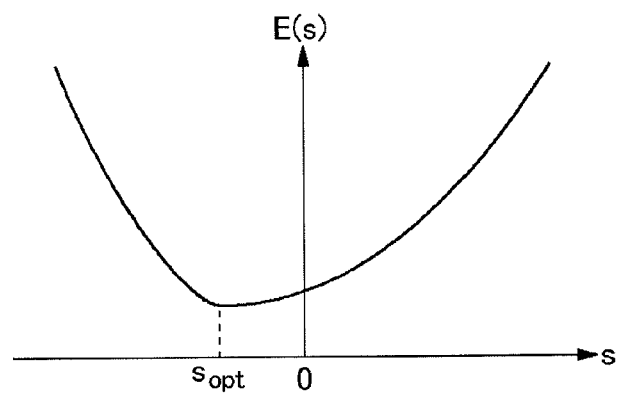
FIG. 10B is a diagram illustrating the approximate outline of the evaluation function E(s) when a histogram obtained in the middle of a change from the histogram shown in FIG. 6A to the histogram shown in FIG. 6B is used.
Figure 10C:
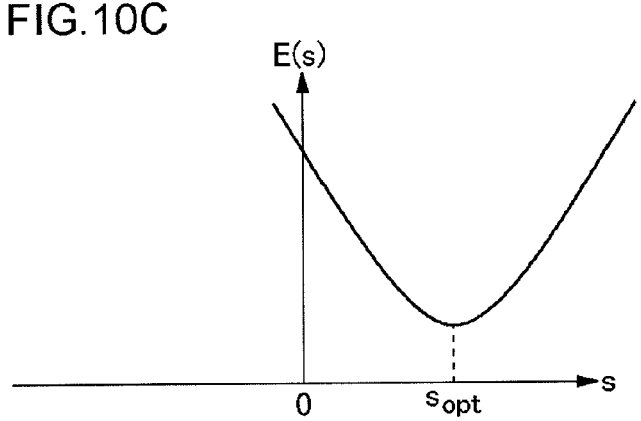
FIG. 10C is a diagram illustrating the approximate outline of the evaluation function E(s) when the histogram shown in FIG. 6B is used.

FIG. 10 is a diagram explaining a change in a shift amount obtained using the evaluation function E(s). FIG. 10A is a diagram illustrating the approximate outline of the evaluation function E(s) when the histogram shown in FIG. 6A is used. FIG. 10C is a diagram illustrating the approximate outline of the evaluation function E(s) when the histogram shown in FIG. 6B is used. FIG. 10B is a diagram illustrating the approximate outline of the evaluation function E(s) when a histogram obtained in the middle of a change from the histogram shown in FIG. 6A to the histogram shown in FIG. 6B is used.

When the viewer displays the parallax image 206 while panning the parallax image 206 starting from the image shown in FIG. 3 until the image shown in FIG. 4 is displayed, the histogram of a parallax distribution changes from the histogram shown in FIG. 6A to the histogram shown in FIG. 6B. Only the subject 200a is being captured in the display area of the parallax image 206, and the subject 200b also starts to show gradually.

As shown in FIG. 10A, shifting the histogram shown in FIG. 6A in the negative direction along the x-axis allows the histogram to have a distribution concentrating near the origin. Therefore, $s_{opt}$ has a negative value. When the subject 200a starts to show in the display area of the parallax image 206 due to the panning of the video image by the viewer, the histogram of the parallax distribution changes from the histogram shown in FIG. 6A to the histogram shown in FIG. 6B, and the shape of the graph of the evaluation function E(s) changes to the shape shown in FIG. 10B. In comparison of the shape of the graph of the evaluation function E(s) shown in FIG. 10A and the shape of the graph of the evaluation function E(s) shown in FIG. 10B, the two graphs share similarity in that the both graphs have a minimum value at $s_{opt}$. However, the graph of the evaluation function E(s) shown in FIG. 10B is different in that an inclination with respect to an s-axis becomes smaller after $s_{opt}$. As the size of the subject 200a shown in the display area of the parallax image 206 becomes larger, the shape of the graph of the evaluation function E(s) eventually becomes the shape shown in FIG. 10C, and $s_{opt}$ will have a positive value. As described, even when a display area is continuously changed while a parallax image 206 is being panned, a proper shift amount at that time will change rapidly from a negative value to a positive value.

When a shift amount changes greatly, a subject that had been perceived to be localized near a display device suddenly starts being perceived to be localized behind the display device by a viewer. In this case, the viewer is forced to have a rapid viewpoint adjustment, which can be a burden.

[Image Processing Apparatus 100]

An image processing apparatus 100 according to the embodiment performs control such that a proper shift amount employed in association with a display area of a parallax image is changed, as described above, continuously changes.

Figure 11:
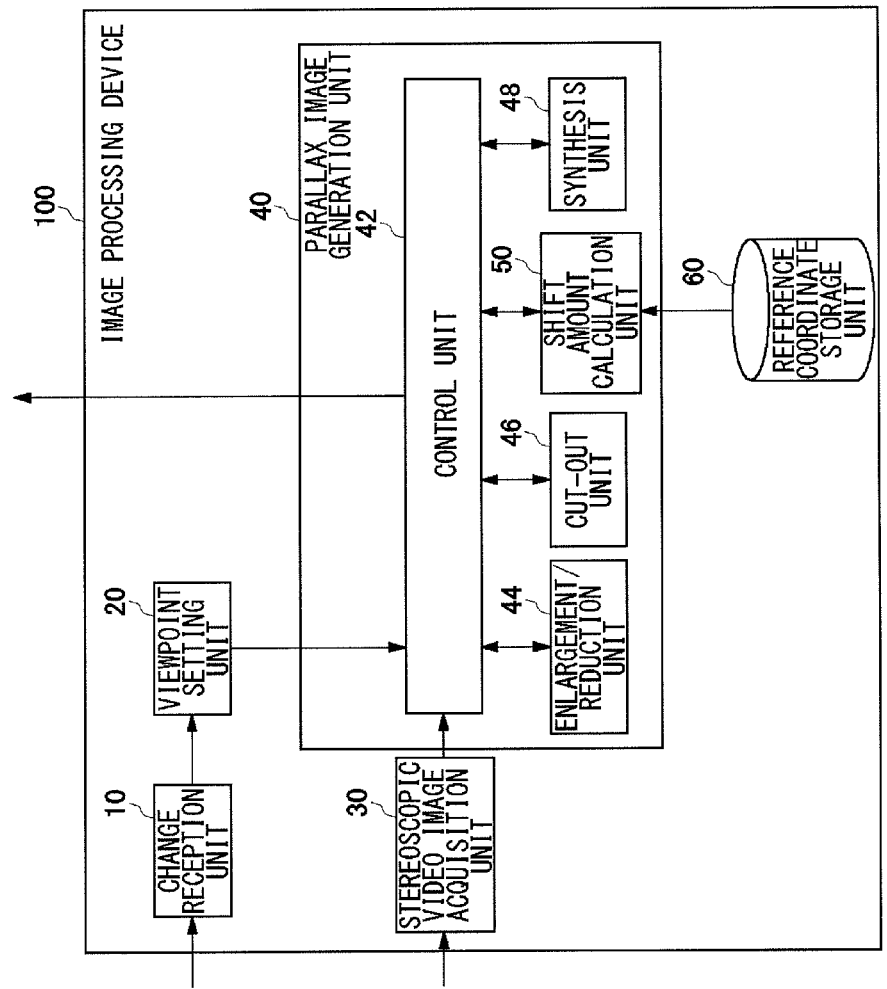
FIG. 11 is a diagram schematically illustrating the functional configuration of an image processing apparatus according to an embodiment.

FIG. 11 is a diagram schematically illustrating the functional configuration of the image processing apparatus 100 according to the embodiment. The image processing apparatus 100 according to the embodiment comprises a change reception unit 10, a viewpoint setting unit 20, a stereoscopic video image acquisition unit 30, a parallax image generation unit 40, and a reference coordinate storage unit 60.

Figure 15:
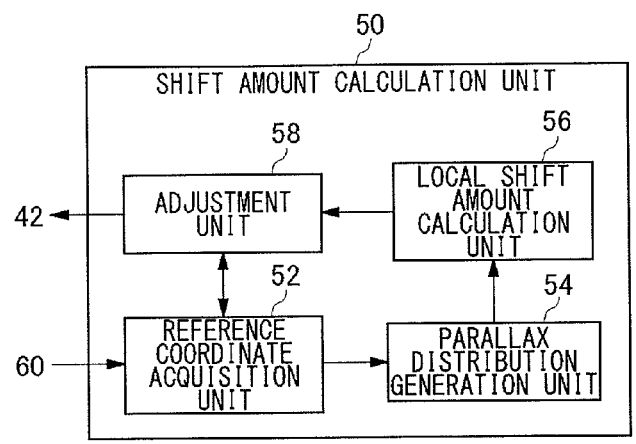
FIG. 15 is a diagram schematically illustrating the functional configuration of a shift amount calculation unit according to the embodiment.

FIG. 11 and FIG. 15 that is described later illustrate a functional configuration for realizing the image processing apparatus 100 according to the embodiment. Other configurations are omitted. In FIGS. 11 and 15, the elements shown in functional blocks that indicate a variety of processes are implemented in hardware by any CPU (Central Processing Unit), main memory, or other LSI's (Large Scale Integrations), and in software by a program loaded in main memory, etc. Thus, a person skilled in the art should appreciate that there are many ways of accomplishing these functional blocks in various forms in accordance with the components of hardware only, software only, or the combination of both. Although not limited to any particular one, an example of the image processing apparatus 100 according to the embodiment includes a game console.

The stereoscopic video image acquisition unit 30 acquires a stereoscopic video image from a stereoscopic video image reproduction unit (not shown) such as a decoder. The stereoscopic video image acquisition unit 30 also acquires a stereoscopic video image through a broadcasting network such as a terrestrial digital network.

The change reception unit 10 receives an instruction for changing the enlargement/reduction ratio and display position of a stereoscopic video image reproduced by the image processing apparatus 100 from the viewer via a controller (not shown) serving as an interface provided with the image processing apparatus 100. For example, in the case of reproducing a stereoscopic panoramic image while automatically scrolling the stereoscopic panoramic image, the change reception unit 10 also acquires an instruction for changing the display position of the video image thereof.

Figure 12:
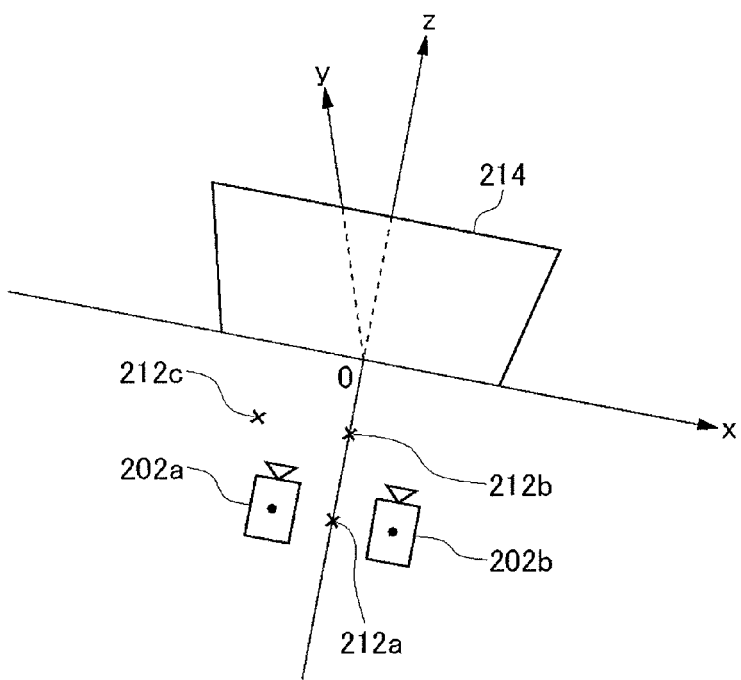
FIG. 12 is a diagram explaining a relationship between a change in an enlargement/reduction ratio and in a display position and a viewpoint position.

Changing the enlargement/reduction ratio and display position of a stereoscopic video image being displayed corresponds to changing the position of a viewpoint for observing a subject captured in the stereoscopic video image. FIG. 12 is a diagram explaining a relationship between a change in an enlargement/reduction ratio and in a display position and a viewpoint position. In FIG. 12, coordinate axes of x, y, and z are set in a three dimensional space, and a display plane 214 is provided on an xy plane such that one side of the display plane 214 of a display device comes into contact with the x-axis. The origin of the coordinate axes is set such that the midpoint of the side of the display plane 214 that is in contact with the x-axis becomes the origin. The z-axis is set such that a value thereof becomes negative on the viewpoint side and positive on the back side with respect to the display device.

A stereoscopic video image obtained when a subject is observed from a given viewpoint has a predetermined parallax map, and the subject can be virtually rearranged in the above-stated three dimensional space using this parallax map. For example, it is assumed that the stereoscopic video image that has been provided is a video image obtained when the subject is observed from the left-eye camera 202a and the right-eye camera 202b shown in FIG. 12. A stereoscopic video image is observed from two cameras 202, i.e., two viewpoints. For the sake of convenience, a midpoint between the two viewpoints is hereinafter referred to as a "viewpoint." More specifically, the above-stated stereoscopic video image is a video image observed from a viewpoint 212a shown in FIG. 12.

Enlarging a stereoscopic video image for display by a viewer corresponds to moving the viewpoint 212a in the positive direction of the z-axis. For example, in comparison with a video image observed from the viewpoint 212a, a subject is enlarged for display in a video image observed from a viewpoint 212b, whose z-coordinate is larger than the z-coordinate of the viewpoint 212a. Further, observing a video image while moving from the viewpoint 212b to the viewpoint 212c corresponds to panning the video image. As described, changing the enlargement/reduction ratio and display position of a stereoscopic video image being displayed can be associated with changing the position of a viewpoint for observing a subject captured in the stereoscopic video image.

FIG. 11 is further explained. Upon receipt of the instruction for changing the enlargement/reduction ratio and display position of the stereoscopic video image from the change reception unit 10, the viewpoint setting unit 20 calculates a corresponding viewpoint position and sets a virtual viewpoint for observing the subject in the stereoscopic video image from the viewpoint at the corresponding viewpoint position.

The parallax image generation unit 40 generates a left-eye parallax image and a right-eye parallax image for providing the above-stated proper parallax distribution that are obtained when an observation is made from the viewpoint set by the viewpoint setting unit 20, by shifting the image cut-out position of at least one of the left-eye parallax image or the right-eye parallax image. The parallax image generation unit 40 comprises a control unit 42, an enlargement/reduction unit 44, a cut-out unit 46, a shift amount calculation unit 50, and a synthesis unit 48. The synthesis unit 48 synthesizes two different stereoscopic video images so as to produce a new single stereoscopic video image. The details of the synthesis unit 48 will be described later.

The control unit 42 controls the operation of the parallax image generation unit 40 in an integrated manner. More specifically, the control unit 42 controls the enlargement/reduction unit 44 for enlarging or reducing an image and the cut-out unit 46 for clipping a part of the image so as to generate a parallax image from an original image for parallax adjustment based on the shift amount and enlargement/reduction ratio calculated by the shift amount calculation unit 50.

If the occasion arises where the shift amount at the image cut-out position needs to be changed along with a change made in the position for setting the virtual viewpoint by the viewpoint setting unit 20, the parallax image generation unit 40 generates a parallax image while changing the shift amount in stages from a shift amount obtained before the change to a shift amount obtained after the change. More specifically, the shift amount calculation unit 50 in the parallax image generation unit 40 generates a shift amount such that the shift amount changes in stages. An explanation is given regarding an algorithm for changing the shift amount in stages in the following.

A shift amount $s_{opt}$ obtained from the above-stated expression (2) for a parallax image when an observation is made from the viewpoint set by the viewpoint setting unit 20 is a shift amount obtained at the single viewpoint. Thus, it is possible that the shift amount changes rapidly if the viewpoint moves. For example, as explained in reference to FIG. 10, a rapid change in the shift amount can occur if a stereoscopic video image is reproduced while moving a viewpoint. FIGS.

Figure 13A:
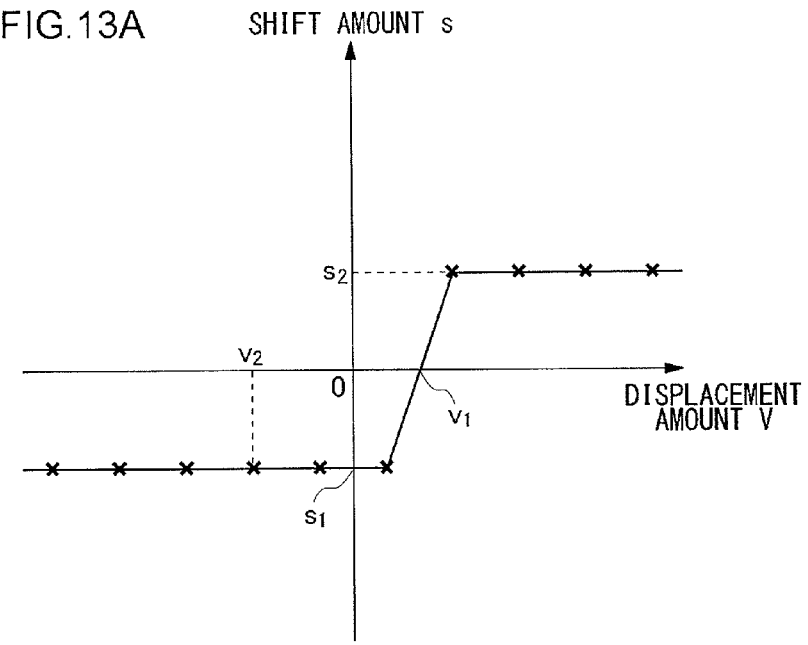
FIG. 13A is a diagram illustrating an example of a relationship between a displacement amount v of a viewpoint and a shift amount.

13A and 13B are diagrams each illustrating an example of a relationship between a displacement amount v of a viewpoint and a shift amount. FIG. 13A is a diagram showing that the shift amount is $s_1$ when the displacement amount of a viewpoint is less than $v_1$ and that the shift amount rapidly changes to $s_2$ when the displacement amount of the viewpoint is $v_1$ or more.

Figure 13B:
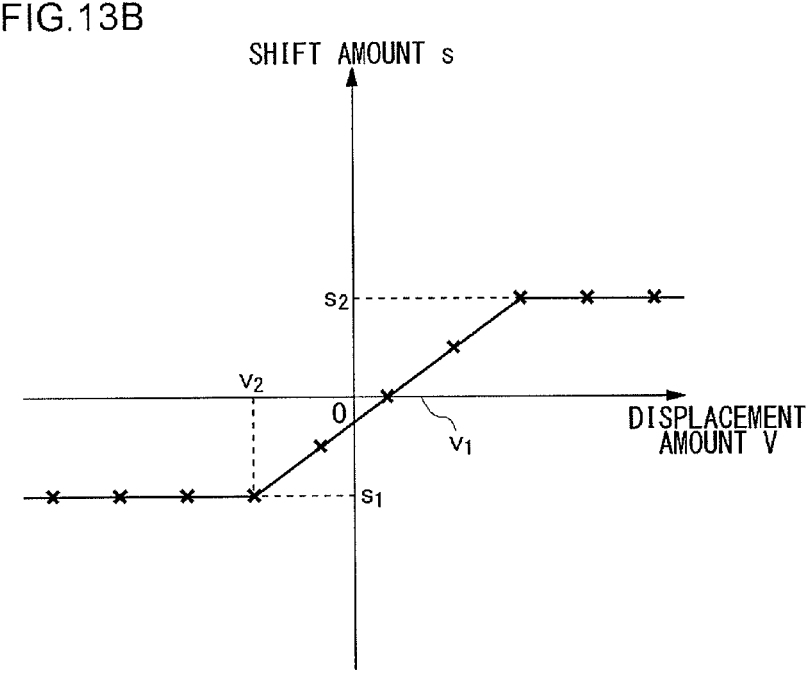
FIG. 13B is a diagram illustrating another example of a relationship between a displacement amount v of a viewpoint and a shift amount.

In order to prevent such a rapid change in the shift amount, the shift amount calculation unit 50 changes the shift amount in stages from $s_1$ to $s_2$ when the displacement amount v is around $v_1$ as shown in FIG. 13B. The general outline of an algorithm for achieving this is to obtain a shift amount at a viewpoint set by the viewpoint setting unit 20 in consideration of a shift amount around the viewpoint. For example, in FIG. 13A, it is possible to allow the shift amount to change gradually, if it can be found out that the shift amount rapidly changes from $s_1$ to $s_2$ when the displacement amount changes from $v_2$ to $v_1$. Thus, a shift-amount calculation reference point is set in advance that serves as a reference for calculating a shift amount at an image cut-out position in a virtual three-dimensional space of the stereoscopic video image explained in reference to FIG. 12. When the viewpoint setting unit 20 sets a viewpoint, a shift amount is calculated in consideration of a shift amount obtained at a shift-amount calculation reference point that exists near the viewpoint. More specifically, a weighted average of a shift amount obtained at a shift-amount calculation reference point that exists near a viewpoint is set to be a shift amount at the viewpoint.

Figure 14:
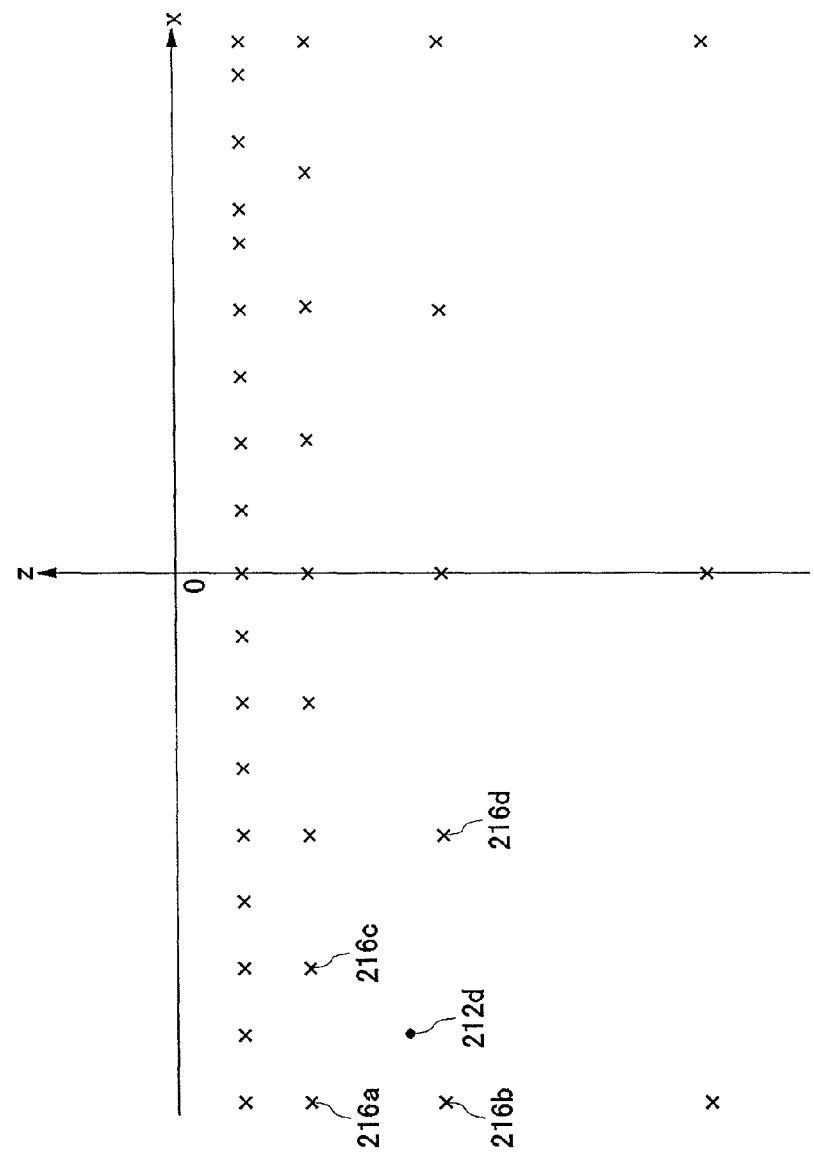
FIG. 14 is a diagram illustrating an example of a shift-amount calculation reference point in a virtual three-dimensional space.

FIG. 14 is a diagram illustrating an example of a shift-amount calculation reference point in a virtual three-dimensional space. The position coordinates of a shift-amount calculation reference point are stored in the reference coordinate storage unit 60. For the sake of ease of explanation, FIG. 14 illustrates only shift-amount calculation reference points that are on an xz plane. However, shift-amount calculation reference points are distributed in a three-dimensional space.

In an example shown in FIG. 14, the shift-amount calculation reference points are arranged in a concentrated manner as a z-coordinate value becomes larger. This is because when the z-coordinate at the position of a viewpoint is large, a stereoscopic video image is enlarged for display thus narrowing the field of view, and a change in the image associated with displacement thus becomes large. On the contrary, when the z-coordinate at the position of the viewpoint becomes small, the stereoscopic video image is reduced for display. Thus, the density of an arrangement of shift-amount calculation reference points may be rough. Therefore, the shift-amount calculation reference points are arranged in a log-linear shape in the z-axis direction, which is the line of sight. The position at which each shift-amount calculation reference point is not limited to this and may be determined through experiments in consideration of calculation costs, memory capacity, etc.

FIG. 15 is a diagram schematically illustrating the functional configuration of a shift amount calculation unit 50 according to the embodiment. The shift amount calculation unit 50 comprises a reference coordinate acquisition unit 52, a parallax distribution generation unit 54, a local shift amount calculation unit 56, and an adjustment unit 58.

In reference to the reference coordinate storage unit 60, the reference coordinate acquisition unit 52 acquires the respective position coordinates of shift-amount calculation reference points that exist near the position of the viewpoint set by the viewpoint setting unit 20. The "shift-amount calculation reference points that exist near the position of the viewpoint" are eight shift-amount calculation reference points that are located near the position of the viewpoint in the three-dimensional space and are a collection of points forming a hexahedron having each shift-amount calculation reference point as a vertex. In the example shown in FIG. 14, shift-amount calculation reference points are shown only on the xz plane. However, if a viewpoint 212*d* is provided, shift-amount calculation reference points 216*a*-216*d* that are located near the viewpoint 212*d* are selected as neighboring points.

The parallax distribution generation unit 54 generates the distribution of parallaxes between a left-eye parallax image and a right-eye parallax image of a stereoscopic video image obtained when an observation is made after providing viewpoint at each set of position coordinates acquired by the reference coordinate acquisition unit 52. Based on the parallax distribution generated by the parallax distribution generation unit 54, the local shift amount calculation unit 56 generates a parallax adjustment amount such that parallaxes between the left-eye parallax image and the right-eye parallax image of a stereoscopic video image are within the range of the above-stated "minimal parallax distribution to be satisfied as a stereoscopic video image" and obtains a shift amount $s_{opt}$ for achieving the above-stated "proper parallax distribution."

The adjustment unit 58 sets a weighted average of shift amounts $s_{opt}$ at the respective position coordinates of the shift-amount calculation reference points calculated by the local shift amount calculation unit 56 to be the value of a shift amount obtained when an observation is made at the viewpoint set by the viewpoint setting unit 20.

The adjustment unit 58 employs, as a weighting coefficient used when obtaining the weighted average, a coefficient that is similar to a weighting coefficient in a three-dimensional linear interpolation method in an image interpolation field. More specifically, the adjustment unit 58 sets, as a weight used when obtaining the weighted average, the ratio of the volume of each of a plurality of solids obtained by dividing, by three planes that are perpendicular to one another having a point of intersection at the position of the viewpoint set by the viewpoint setting unit 20, a solid having as a vertex the position coordinates of each shift-amount calculation reference point obtained by the reference coordinate acquisition unit 52 to the volume of the solid having each set of position coordinates as a vertex. The three planes that are perpendicular to one another are planes that are parallel to the xy plane, the yz plane, and the xz plane, respectively.

Figure 16:
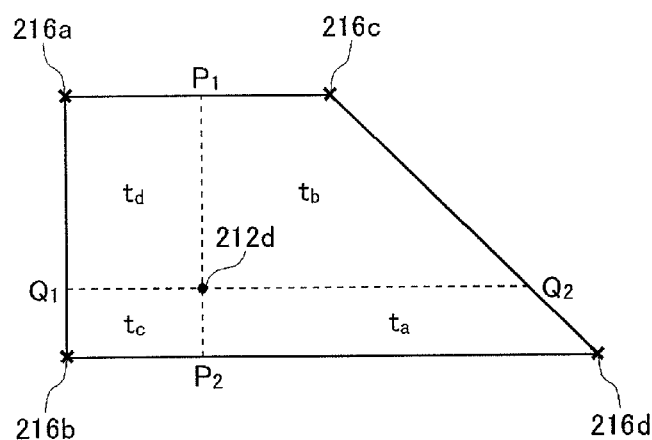
FIG. 16 is a diagram for explaining a weighting coefficient of a parallax adjustment amount.

FIG. 16 is a diagram for explaining a weighting coefficient of a parallax adjustment amount and is a diagram obtained by enlarging a part of FIG. 14. For the sake of ease of explanation, an explanation is given regarding a two-dimensional case. However, a skilled person would easily extend the scope to encompass a three-dimensional linear interpolation method.

In FIG. 16, a line segment $P_1P_2$ is parallel to the z-axis, and a line segment $Q_1Q_2$ is parallel to the x-axis. The line segment $P_1P_2$ and the line segment $Q_1Q_2$ has a point of intersection at the viewpoint 212*d*. The shift-amount calculation reference points 216*a*-216*d* are shift-amount calculation reference points that exist near the viewpoint 212*d*. The respective shift amounts at the shift-amount calculation reference points 216*a*-216*d* are denoted by $s_a$, $s_b$, $s_c$, and $s_d$, respectively, and the area of a square having as vertices the shift-amount calculation reference points 216*a*-216*d* is denoted by T.

The square having as vertices the shift-amount calculation reference points 216*a*-216*d* is divided into four squares by the two line segment $P_1P_2$ and the line segment $Q_1Q_2$ that are perpendicular to each other having a point of intersection at the viewpoint 212*d*. In this case, the respective areas of the squares located symmetrically to the shift-amount calculation reference points 216a-216d with respect to the viewpoint 212d are denoted by $t_a$, $t_b$, $t_c$, and $t_d$, respectively.

In this case, the respective areas $t_a$, $t_b$, $t_c$, and $t_d$ of the squares are values that reflect the "closeness" of the shift-amount calculation reference points 216a-216d to the viewpoint 212d, respectively. For example, as the distance between the shift-amount calculation reference point 216a and the viewpoint 212d becomes shorter, the area $t_a$ becomes larger. The respective areas $t_a$, $t_b$, $t_c$, and $t_d$ of the squares can be used as rates of contribution of the shift-amount calculation reference points 216a-216d, respectively, when calculating a shift amount at the viewpoint 212d. This is based on a premise that a shift amount at the viewpoint 212d is close to a shift amount at a shift-amount calculation reference point 216 when the distance between the viewpoint 212d and the shift amount at a shift-amount calculation reference point 216 is shorter.

Thus, a shift amount s at the viewpoint 212d is obtained in the following expression (3).

$$s=(t_a s_a + t_b s_b + t_c s_c + t_d s_d)/T \quad (3)$$

where $T=t_a+t_b+t_c+t_d$

The adjustment unit 58 according to the embodiment calculates a weight used when obtaining a weighted average by applying the same concept in three dimensions in an encompassed manner.

Using the shift amount s obtained at the viewpoint 212d as the weighted average of the shift amounts obtained at the shift-amount calculation reference points 216a-216d that exist near the viewpoint 212d has an effect of filtering the shift amounts obtained at the respective points with a low-pass filter so as to round the shift amounts. With this, a rapid change in a shift amount can be prevented, and a shift amount can be calculated such that the shift amount changed in stages.

As another method for filtering a shift amount with a low-pass filter so as to round the shift amount, it is also possible to use, for example, a method for obtaining a moving average with a shift amount obtained in the past and using the moving average as a current shift amount. It is also possible to calculate a shift amount such that the shift amount changes in stages. However, since a shift amount at a given viewpoint position is affected by a shift amount in the past, a time delay can be caused for the shift amount. In addition, there can be a situation where a shift amount at a given viewpoint position changes depending on a path to approach the viewpoint position.

In contrast, if a shift amount s obtained at a viewpoint position is used as a weighted average of shift amounts obtained at shift-amount calculation reference points that exist nearby, the shift amount is uniquely determined when the viewpoint position is determined. Thus, the shift amount does not change depending on a path to approach the viewpoint position, and there will be no time delay.

To use a weighted average for the calculation of a shift amount obtained at a viewpoint position is an example of a method for calculating a shift amount. Any methods may be used to obtain a shift amount at a viewpoint position as long as the value of the shift amount at the viewpoint position is between the minimum shift amount value and the maximum shift amount value, all inclusive, that are obtained at a shift-amount calculation reference point that exists near the viewpoint. For example, various methods can be possible such as a method for employing, as a shift amount at a viewpoint, an average value between the minimum shift amount value and the maximum shift amount value obtained at a shift-amount calculation reference point that exists near the viewpoint.

Figure 17:
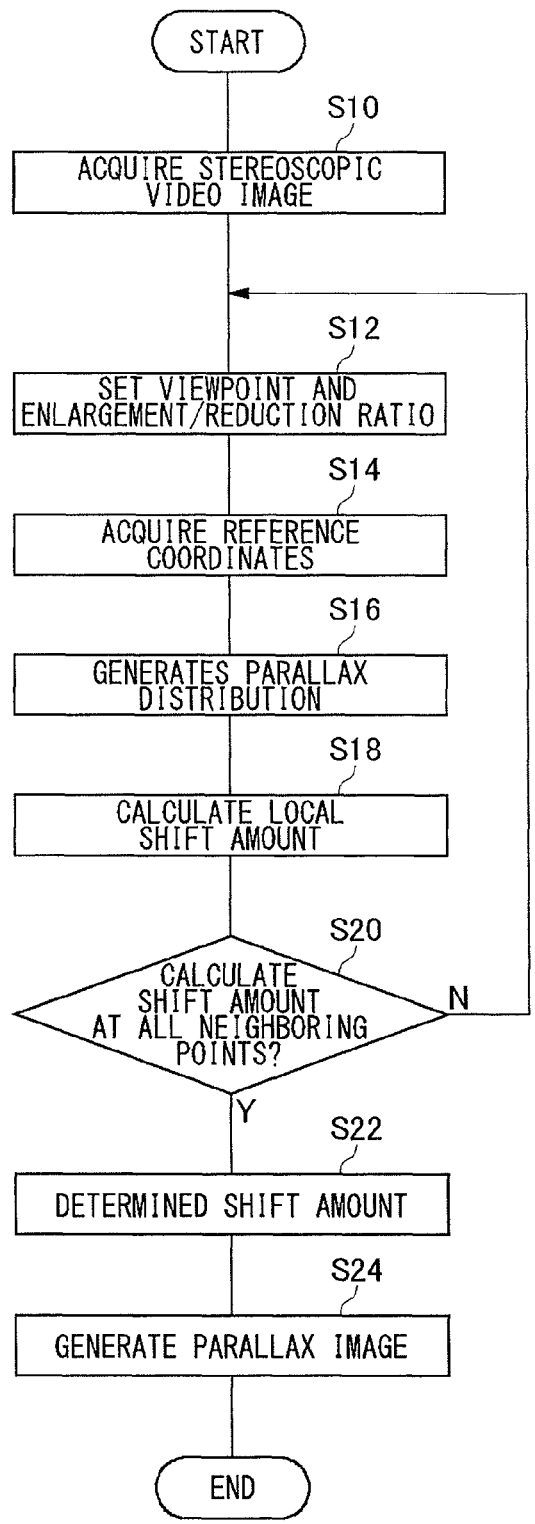
FIG. 17 is a flow chart explaining a process flow of the image processing apparatus according to the embodiment.

FIG. 17 is a flow chart explaining a process flow of the image processing apparatus 100 according to the embodiment. Processes in the flowchart are started, for example, when the power of the image processing apparatus 100 is turned on.

The stereoscopic video image acquisition unit 30 acquires a stereoscopic video image including a left-eye parallax image and a right-eye parallax image that have a predetermined parallax map and a parallax distribution in the case where a subject is observed from a given viewpoint (S10). In order to observe the subject from a different viewpoint at a different magnification ratio, the viewpoint setting unit 20 sets the position of the viewpoint and the enlargement/reduction ratio of an image (S12).

In reference to the reference coordinate storage unit 60, the reference coordinate acquisition unit 52 acquires the position coordinates of a shift-amount calculation reference point that exists near the position of the viewpoint set by the viewpoint setting unit 20 (S14). The parallax distribution generation unit 54 generates a parallax distribution of a stereoscopic video image obtained when the subject is observed from the shift-amount calculation reference point acquired by the reference coordinate acquisition unit 52 (S16). Based on the parallax distribution generated by the parallax distribution generation unit 54, the local shift amount calculation unit 56 calculates a local shift amount $s_{opt}$ at the shift-amount calculation reference point acquired by the reference coordinate acquisition unit 52 (S18).

The local shift amount calculation unit 56 repeats the above-stated steps 12 through 18 until a completion of a shift amount calculation at all shift-amount calculation reference points acquired by the reference coordinate acquisition unit 52 (N in S20). When the local shift amount calculation unit 56 completes the shift amount calculation at all the shift-amount calculation reference points acquired by the reference coordinate acquisition unit 52 (Y in S20), the adjustment unit 58 calculates a weighted-average shift amount at each reference point and determines the weighted-average shift amount as the shift amount obtained at the viewpoint position set by the viewpoint setting unit 20 (S22).

Based on the shift amount calculated by the adjustment unit 58, the control unit 42 controls the enlargement/reduction unit 44 and the cut-out unit 46 so as to generate a parallax image (S24). When the control unit 42 generates a parallax image by controlling the enlargement/reduction unit 44 and the cut-out unit 46, the processes in the flowchart are ended.

The operation of the above configuration is shown in the following. If a viewer changes the display position and the enlargement/reduction ratio of a stereoscopic video image using the image processing apparatus 100 when viewing the stereoscopic image, the shift amount calculation unit 50 generates a shift amount at a parallax image cut-out position such that a stereoscopic video image desired by the viewer has a proper parallax distribution. In this case, if it is necessary to change the shift amount for the parallax image in association with a further change made by the viewer in the display position and the enlargement/reduction ratio of the stereoscopic video image, the shift amount calculation unit 50 controls the shift amount so that stereoscopic video images before and after the change connect smoothly. With this, a burden can be reduced that is associated with stereoscopic viewing while adjusting the convergence angle of both eyes, etc., imposed on the viewer due to a rapid change in the shift amount.

As explained in the above, a technology for reducing a burden on a viewer that is associated with stereoscopic image viewing can be provided according to the embodiment.

Described above is an explanation of the present invention based on the embodiments. The embodiment is intended to be illustrative only, and it will be obvious to those skilled in the art that various modifications to constituting elements and processes could be developed and that such modifications are also within the scope of the present invention.

[Exemplary Variation]

An explanation is given regarding an exemplary variation of the image processing apparatus 100 according to the embodiment. The above explanation has been made regarding a case that is based on a premise that the stereoscopic video image acquisition unit 30 acquires one type of a stereoscopic video image. However, the stereoscopic video image acquisition unit 30 may acquire two different stereoscopic video images.

For example, on a part of one stereoscopic video image, the other stereoscopic video image may be superimposed and reproduced. Possible cases are those where one stereoscopic video image is a video image captured during travel while the other stereoscopic video image is a video image of a movie or the like or a videophone video image.

Figure 18:
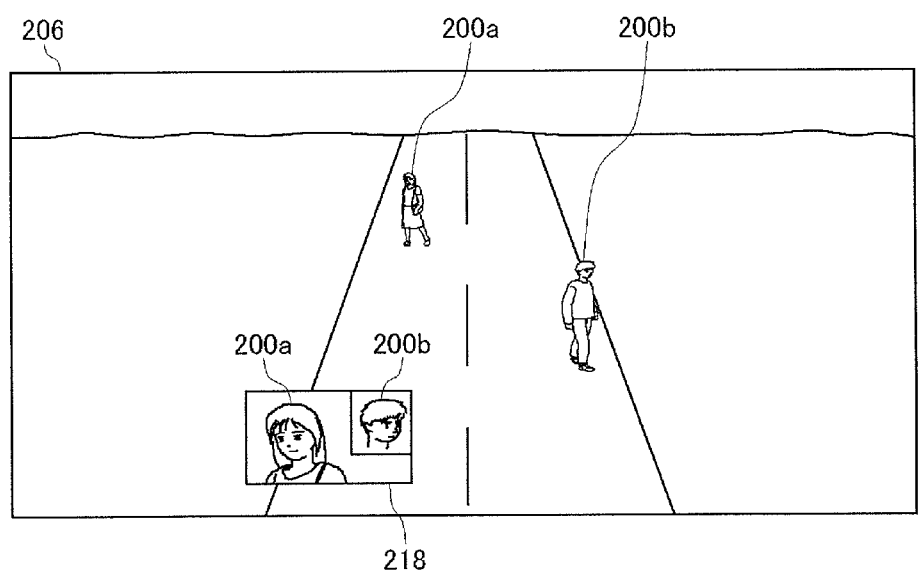
FIG. 18 is a diagram illustrating an example for reproducing stereoscopic video images while superimposing, on a part of one stereoscopic video image, the other stereoscopic video image.

FIG. 18 is a diagram illustrating an example for reproducing stereoscopic video images while superimposing, on a part of one stereoscopic video image, the other stereoscopic video image. In the example shown in FIG. 18, on a stereoscopic video image including a parallax image 206 in which two subjects 200a and 200b exist, an interface 218 displaying a video image of a videophone call between the subjects 200a and 200b is superimposed for display.

More specifically, the synthesis unit 48 acquires a first stereoscopic video image and a second stereoscopic video image different from the first stereoscopic video image from the stereoscopic video image acquisition unit 30 and then superimposes, on a part of the first stereoscopic video image, the second stereoscopic video image. Based on a parallax distribution generated by the parallax distribution generation unit 54 for the first stereoscopic video image, the synthesis unit 48 identifies a subject that is localized closest to the observer from a display device in the stereoscopic video image. The synthesis unit 48 further superimposes the second stereoscopic video image such that the second stereoscopic video image is localized even closer to the viewer compared to the identified subject.

With this, the subjects 200a and 200b can enjoy conversation by a videophone while viewing the same stereoscopic video image. Since the interface 218 for the videophone is localized closer to the viewpoint compared to the stereoscopic video image including the parallax image 206, interference to the interface 218 by the video image of the parallax image 206 can be prevented at this time.

When the synthesis unit 48 synthesizes two stereoscopic video images, the shift amount calculation unit 50 generates a shift amount treating the synthesized stereoscopic video images as a new single stereoscopic video image. With this, a burden can be reduced that is associated with stereoscopic viewing while adjusting the convergence angle of both eyes, etc., imposed on the viewer viewing synthesized stereoscopic video images.

What is claimed is:

1. An image processing apparatus comprising:
a viewpoint setting unit configured to set, when a stereoscopic video image is provided that includes a left-eye parallax image and a right-eye parallax image having a predetermined parallax distribution and that is observed from a given viewpoint, a virtual viewpoint for observing a subject in the stereoscopic video image from another viewpoint;
a parallax image generation unit configured to generate a left-eye parallax image and a right-eye parallax image for providing a desired parallax distribution obtained when an observation is made from the viewpoint set by the viewpoint setting unit, by shifting an image cut-out position of at least one of the left-eye parallax image or the right-eye parallax image,
wherein, when a shift amount at the image cut-out position changes due to a change made in the position of the virtual viewpoint, the parallax image generation unit generates a parallax image while changing the shift amount in stages, from a shift amount obtained before the change to a shift amount obtained after the change, and
a reference coordinate storage unit configured to store the position coordinates of a shift-amount calculation reference point that is determined as a reference for calculating a shift amount at an image cut-out position in a virtual three-dimensional space of the stereoscopic video image,
wherein, the parallax image generation unit acquires, in reference to the reference coordinate storage unit, the respective position coordinates of shift-amount calculation reference points that exist near the position of the viewpoint set by the viewpoint setting unit and further includes a shift amount calculation unit configured to calculate, as the value of a shift amount, a value that is greater than or equal to a minimum shift amount value but less than or equal to a maximum shift amount value, all inclusive, calculated based on stereoscopic video images of the subject obtained when an observation is made at the respective position coordinates.

2. The image processing apparatus according to claim 1, wherein the shift amount calculation unit includes:
a reference coordinate acquisition unit configured to acquire, in reference to the reference coordinate storage unit, the respective position coordinates of the shift-amount calculation reference points that exist near the position of the viewpoint set by the viewpoint setting unit;
a parallax distribution generation unit configured to generate the distribution of parallaxes between a left-eye parallax image and a right-eye parallax image of a stereoscopic video image obtained when an observation is made after providing viewpoint at each set of position coordinates acquired by the reference coordinate acquisition unit;
a local shift amount calculation unit configured to generate, based on the distribution of parallaxes generated by the parallax distribution generation unit, a parallax adjustment amount such that the parallaxes between the left-eye parallax image and the right-eye parallax image of the stereoscopic video image are within a predetermined parallax range and to obtain a shift amount that allows many subjects to be localized near a display device for displaying the stereoscopic video image; and
an adjustment unit configured to set a weighted average of shift amounts obtained at the respective position coordinates of the reference points calculated by the local shift amount calculation unit to be the value of a shift amount obtained when an observation is made at the viewpoint set by the viewpoint setting unit.

3. The image processing apparatus according to claim 2, wherein the adjustment unit sets, as a weight used when obtaining the weighted average, the ratio of the volume of each of a plurality of sub-solids to the volume of a solid, the solid having, as a vertex, each set of position coordinates acquired by the reference coordinate acquisition unit, the plurality of sub-solids being obtained by dividing the solid by three planes that are perpendicular to one another, and the three planes that are perpendicular to one another having a point of intersection at the position of the viewpoint set by the viewpoint setting unit.

4. The image processing apparatus according to claim 3 further comprising:

a synthesis unit configured to acquire a first stereoscopic video image and a second stereoscopic video image different from the first stereoscopic video image and then superimpose, on a part of the first stereoscopic video image, the second stereoscopic video image, wherein the synthesis unit identifies, based on the distribution of parallaxes generated by the parallax distribution generation unit for the first stereoscopic video image, a subject localized closest to the viewpoint from the display device in the first stereoscopic video image and superimposes the second stereoscopic video image such that the second stereoscopic video image is localized even closer to the viewpoint compared to the subject.

5. The image processing apparatus according to claim 4, wherein the shift amount calculation unit generates a shift amount treating the synthesized first and second stereoscopic video images as a single stereoscopic video image.

6. An image processing method for allowing a processor to:

set, when a stereoscopic video image is provided that includes a left-eye parallax image and a right-eye parallax image having a predetermined parallax distribution and that is observed from a given viewpoint, a virtual viewpoint for observing a subject in the stereoscopic video image from another viewpoint;

generate a left-eye parallax image and a right-eye parallax image for providing a desired parallax distribution when an observation is made from the viewpoint, by shifting an image cut-out position of one of the left-eye parallax image or the right-eye parallax image;

generate, when a shift amount at the cut-out position changes due to a change made in the position of the virtual viewpoint, a parallax image while changing the shift amount in stages, from a shift amount obtained before the change to a shift amount obtained after the change;

store the position coordinates of a shift-amount calculation reference point that is determined as a reference for calculating a shift amount at an image cut-out position in a virtual three-dimensional space of the stereoscopic video image, acquire the respective position coordinates of shift-amount calculation reference points that exist near the position of the viewpoint; and calculate, as the value of a shift amount, a value that is greater than or equal to a minimum shift amount value but less than or equal to a maximum shift amount value, all inclusive, calculated based on stereoscopic video images of the subject obtained when an observation is made at the respective position coordinates.

7. A non-transitory computer-readable recording medium having instructions which when executed by a processor perform the following steps:

a viewpoint setting module configured to set, using the processor, when a stereoscopic video image is provided that includes a left-eye parallax image and a right-eye parallax image having a predetermined parallax distribution and that is observed from a given viewpoint, a virtual viewpoint for observing a subject in the stereoscopic video image from another viewpoint;

a parallax image generation module configured to generate a left-eye parallax image and a right-eye parallax image for providing a desired parallax distribution obtained when an observation is made from the viewpoint, by shifting an image cut-out position of one of the left-eye parallax image or the right-eye parallax image and configured to generate, when a shift amount at the cut-out position changes due to a change made in the position of the virtual viewpoint, a parallax image while changing the shift amount in stages, from a shift amount obtained before the change to a shift amount obtained after the change, a reference coordinate storage module configured to store the position coordinates of a shift-amount calculation reference point that is determined as a reference for calculating a shift amount at an image cut-out position in a virtual three-dimensional space of the stereoscopic video image, wherein, the parallax image generation module acquires, in reference to the reference coordinate storage module, the respective position coordinates of shift-amount calculation reference points that exist near the position of the viewpoint set by the viewpoint setting module and further includes a shift amount calculation module configured to calculate, as the value of a shift amount, a value that is greater than or equal to a minimum shift amount value but less than or equal to a maximum shift amount value, all inclusive, calculated based on stereoscopic video images of the subject obtained when an observation is made at the respective position coordinates.

* * * * *